(12) United States Patent
Houbiers et al.

(10) Patent No.: US 12,024,996 B2
(45) Date of Patent: Jul. 2, 2024

(54) METHODS FOR ESTIMATING A POSITION OF A WELL PATH WITHIN A SUBSURFACE FORMATION

(71) Applicant: EQUINOR ENERGY AS, Stavanger (NO)

(72) Inventors: Marianne Houbiers, Trondheim (NO); Steen Agerlin Petersen, Bergen (NO); Fredrik Hansteen, Sandsli (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 17/792,952

(22) PCT Filed: Oct. 22, 2021

(86) PCT No.: PCT/NO2021/050219
§ 371 (c)(1),
(2) Date: Jul. 14, 2022

(87) PCT Pub. No.: WO2022/093034
PCT Pub. Date: May 5, 2022

(65) Prior Publication Data
US 2023/0250718 A1    Aug. 10, 2023

(30) Foreign Application Priority Data
Oct. 29, 2020   (GB) .................................. 2017185

(51) Int. Cl.
*E21B 47/0224* (2012.01)
*E21B 49/00* (2006.01)
(Continued)

(52) U.S. Cl.
CPC .......... *E21B 47/0224* (2020.05); *E21B 49/00* (2013.01); *G01V 1/282* (2013.01);
(Continued)

(58) Field of Classification Search
CPC .. E21B 47/0224; E21B 49/00; E21B 2200/20; E21B 7/04; G01V 1/303; G01V 1/282
See application file for complete search history.

(56) References Cited

U.S. PATENT DOCUMENTS

| 7,593,739 B2 * | 9/2009 | Oguri | .................... G01S 5/0054 |
|---|---|---|---|
| | | | 455/456.2 |
| 11,015,433 B2 * | 5/2021 | Li | .......................... E21B 44/00 |

(Continued)

FOREIGN PATENT DOCUMENTS

| CA | 2064279 A1 | 9/1992 |
|---|---|---|
| WO | WO 2006/106337 A1 | 10/2006 |

(Continued)

OTHER PUBLICATIONS

Combined Search And Examination Report issued in Application No. GB2017185.6, dated Apr. 30, 2021.
(Continued)

*Primary Examiner* — Elias Desta
(74) *Attorney, Agent, or Firm* — Birch, Stewart, Kolasch & Birch, LLP

(57) ABSTRACT

A method of estimating a position of a well path within a subsurface formation of the Earth includes determining a well path estimate using navigation measurements from a downhole tool and a position estimate derived from seismic data. A method of geosteering includes estimating a position of the well path and controlling a drill bit in response to the estimated position of the well path to follow a desired well trajectory.

20 Claims, 15 Drawing Sheets

(51) Int. Cl.
*G01V 1/28* (2006.01)
*G01V 1/30* (2006.01)
*E21B 7/04* (2006.01)

(52) U.S. Cl.
CPC ............... *G01V 1/303* (2013.01); *E21B 7/04* (2013.01); *E21B 2200/20* (2020.05); *G01V 2210/60* (2013.01)

(56) References Cited

U.S. PATENT DOCUMENTS

| | | |
|---|---|---|
| 2002/0060570 A1 | 5/2002 | Shirasaka et al. |
| 2015/0253418 A1 | 9/2015 | Poedjono |
| 2016/0202373 A1 | 7/2016 | Diller |

FOREIGN PATENT DOCUMENTS

| | | |
|---|---|---|
| WO | WO 2011/007229 A2 | 1/2011 |
| WO | WO 2017/199104 A1 | 11/2017 |
| WO | WO 2020/167792 A1 | 8/2020 |

OTHER PUBLICATIONS

International Search Report (PCT/ISA/210) issued in PCT/NO2021/050219, dated Dec. 15, 2021.
Written Opinion of the International Searching Authority (PCT/ISA/237) issued in PCT/NO2021/050219, dated Dec. 15, 2021.
Norwegian Office Action and Search Report for Norwegian Application No. 20220852, dated Nov. 3, 2022.

\* cited by examiner

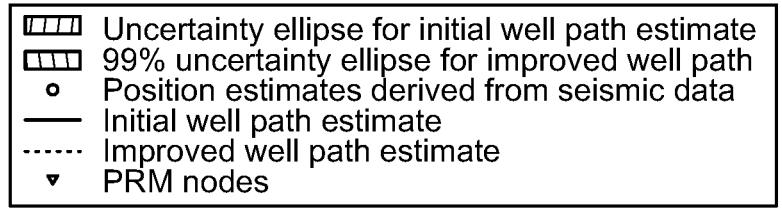
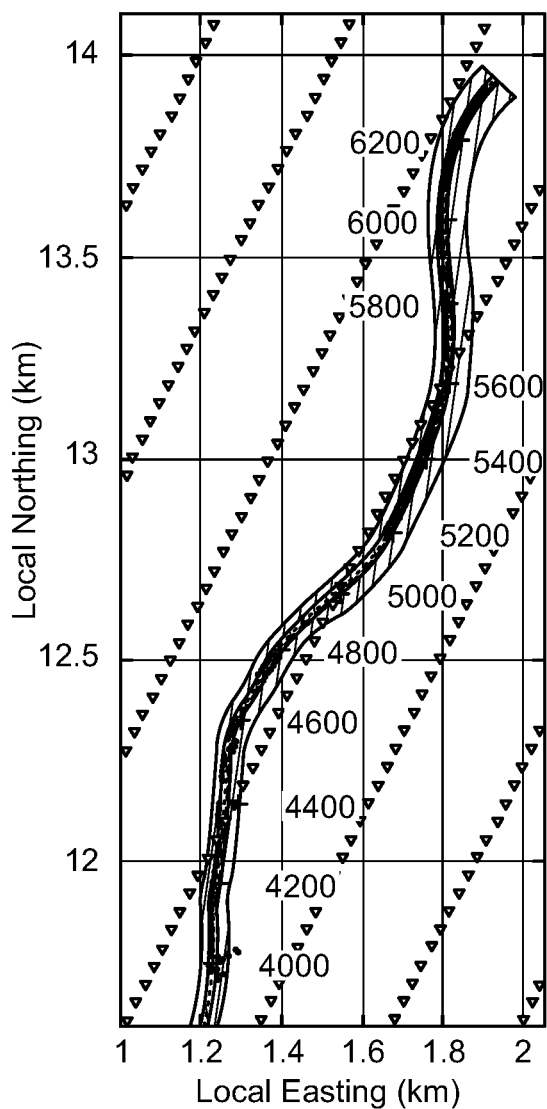
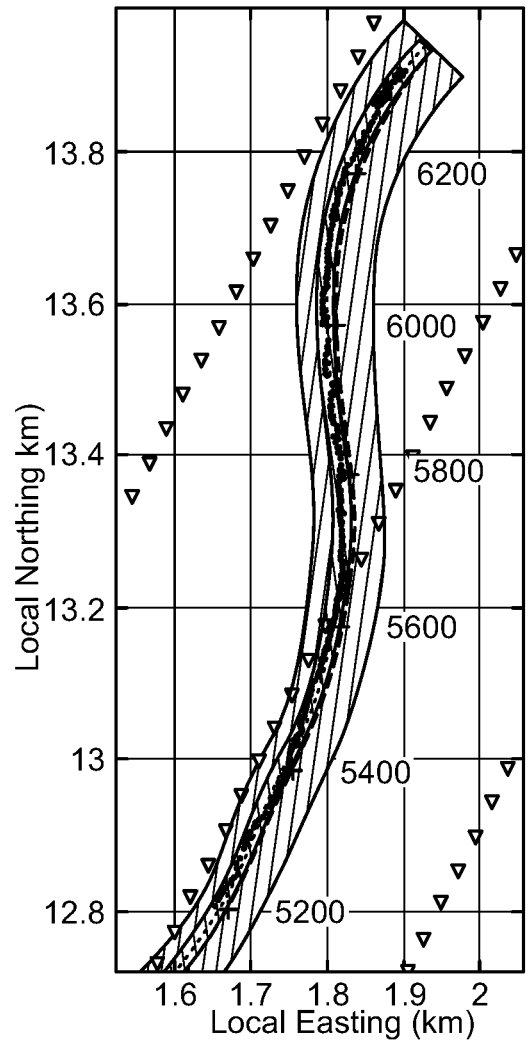
FIG. 10A    FIG. 10B

METHODS FOR ESTIMATING A POSITION OF A WELL PATH WITHIN A SUBSURFACE FORMATION

TECHNICAL FIELD

The present invention relates to the field of sub-surface well location determination, for example during drilling of the well or subsequent to drilling completion.

BACKGROUND

Conventionally, the position of a well is derived from magnetic and/or gyroscopic measurements made while drilling (MWD). The error associated with these measurements accumulates with distance away from the well head, and can become relatively large, especially for long horizontal wells. As a result, measurements for long horizontal wells have large positional uncertainty, for example ±60 m at 6000 m measured depth (MD, i.e. length along the well path). Reducing this uncertainty is important, for example when new infill wells are drilled at 50-75 m lateral distance from existing wells. Other applications for which minimising well position uncertainty is important include wells for small target zones and wells that are in the vicinity of hazard zones such as faults, gas pockets, stringers etc.

SUMMARY OF THE INVENTION

According to a first aspect of the disclosure is a method of estimating a position of a well path within a subsurface formation of the Earth. The method comprises determining a well path estimate using navigation measurements from a downhole tool and a position estimate derived from seismic data.

The well path may describe the trajectory of the well within the subsurface formation of the Earth. The well path may be the well position. The term "well path" or "well path estimate" may, therefore, be replaced with "well position" or "well position estimate" herein. The well path estimate may describe part, or all, of the well's estimated location and trajectory within the subsurface formation. The well path estimate may relate to a specific portion of the entire well path, for example when increased location accuracy is required during a specific part of the well drilling process.

The estimated well path may be calculated using both navigation measurements from a downhole tool and position estimates derived from seismic data. The use of a combination of navigation measurements from a downhole tool and position estimates derived from seismic data may result in a more accurate estimate of the location of the well path.

Methods according to the present disclosure may be conducted in real-time. That is, a well position estimate may be provided and updated simultaneously with the drilling process. This may allow adjustments to the drilling operation to be made responsive to the well position estimate, for example in order to avoid hazards, or steer towards target zones.

Methods according to the present disclosure provide a more accurate well path estimate, e.g. an estimated location of the well path within the subsurface formation. A well path estimate according to the disclosure may have a lower envelope, or ellipse, of uncertainty. The measure of uncertainty may also be independent with measured depth, either in a lateral dimension, a depth dimension, or both a lateral and depth dimension. The present disclosure therefore provides a greater degree of confidence when locating wells within tight tolerances—e.g. between two existing wells, or adjacent specific formations or reservoirs. Accordingly, the present disclosure may facilitate the more efficient use of space within a site.

In the present disclosure the terms vertical, depth, Easting, Northing and lateral are used.

These terms are to be given their usual meaning. In line with their normal meaning and in the absence of context dictating otherwise, vertical may be construed as being an axis aligned with the local gravity direction at that point; depth may be used to refer to the true vertical depth, e.g. a coordinate aligned with the vertical axis and measuring the vertical location of a point below the surface; Easting and Northing are orthogonal Cartesian axes perpendicular to the vertical direction, Northing measures the northward distance, and Easting the eastward distance; and lateral may refer to a plane perpendicular to the vertical, thus in the Easting-Northing plane.

The method may be for estimating the position of a well path in real time. The method may be a method of estimating a position of a well path by estimating the path of a drill bit or other noise source as the well is formed. Alternatively, the method may be for estimating the position of an existing well path. Methods according to the present disclosure may be used at any point during the well's life-cycle, for example during drilling of the well, immediately following drilling of the well and before production, or after production.

The method determines a well path estimate using navigation measurements from a downhole tool. The downhole tool may form part of a drill string, or other downhole string within the well. The downhole tool may be a drill bit. The downhole tool may be another tool lowered in the well before or after completion.

The navigation measurements may be made/recorded while drilling, during the drilling operation, or afterwards. The navigation measurements from a downhole tool may comprise orientation and/or measured depth measurements. The navigation measurements from a downhole tool may comprise magnetic and/or gyroscopic measurements. The navigation measurements may be derived from orientation, measured depth, magnetic or gyroscopic measurements.

The navigation measurements may be in the form of a list of values, or in the form of an initial well path estimate that is determined using the measurements. The navigation measurements may comprise an initial well path estimate, as discussed in more detail below.

The method may comprise determining a well path using measurements obtained from navigation instruments in a well in combination with position estimates from seismic data.

The position estimate may be derived from passive seismic data.

The position estimate may be detected from natural low frequency earth movements. The seismic data may be obtained at the surface, at the seabed and/or in the subsurface.

The position estimate derived from seismic data may be derived using an active downhole source. The position estimate derived from seismic data may be derived using an active seismic source that is recorded at the surface, at the seabed and/or in the subsurface, as described below.

The position estimate derived from seismic data may be a point that is determined to lie on the well path, for example a specific point through which the well is estimated to pass.

The position estimate derived from seismic data may be an estimate of the location at which the drill bit or other noise source is located or has passed through.

The position estimate may be derived from seismic data in accordance with the method described herein.

The seismic data may comprise data from seismic sensors. The seismic data may comprise readings caused by the downhole tool. The seismic data may comprise data relating to noise generated by the downhole tool. The seismic data may comprise data relating to noise generated by a drill bit while drilling and/or other noise generated by a downhole tool. The noise may be specifically generated for identification in the seismic data.

The position estimate derived from seismic data may be a plurality of position estimates derived from seismic data. Although at times the method is described with reference to a single position estimate derived from seismic data, it is to be understood that methods according to the disclosure may use a plurality of such position estimates. As such, any reference to, or description relating to, a position estimate derived from seismic data is to be construed equally as applying to a (a plurality of) position estimates derived from seismic data, and the term "position estimate" may be replaced with "position estimates" anywhere herein. Similarly, discussion relating to a single position estimate applies equally to "each" position estimate.

The method may further comprise identifying, or calculating, a position estimate derived from seismic data. Alternatively, the method may further comprise receiving a position estimate derived from seismic data.

A method for deriving a position estimate from seismic data is discussed below.

The method may further comprise: collecting seismic data from a plurality of seismic sensors spread across a region of the surface of the Earth above the downhole tool and/or located in one or more nearby wells; and deriving the position estimate from the seismic data.

The plurality of seismic sensors may be sensors of a permanent reservoir monitoring array and/or a temporary deployed array at the seabed, and/or downhole sensors in wells. The plurality of seismic sensors may comprise conventional 4D sensors and/or fiber-optic DAS cables. Examples of suitable seismic sensors include geophones, hydrophones and accelerometers.

The method may further comprise outputting the well path estimate.

The well path estimate may comprise a vertical path component and a lateral path component. The vertical path component may be determined using the navigation measurements from a downhole tool. The lateral path component may be determined using the position estimate derived from seismic data.

The method may comprise estimating the vertical path component using the navigation measurements from a downhole tool. The method may comprise estimating the lateral path component using the position estimate derived from seismic data.

The vertical path component may be a depth profile. The vertical path component may describe the (true vertical) depth of the well against the measured depth. The vertical path component may comprise values for the inclination of the well. The inclination of the well may be the angle between the well path and the vertical axis.

The lateral path component may describe the Easting and Northing location of the well against the measured depth. The lateral path component may comprise values for the azimuth of the well path. The azimuth may be the angle between the well path projected onto a horizontal, or lateral, plane and the Northing axis.

The position estimate derived from seismic data may be used when determining the estimated vertical path component. The navigation measurements from a downhole tool may be used when determining the lateral path component. In some examples, both the navigation measurements and seismic data position estimate may be used to determine both the vertical and lateral path components.

Determining the well path estimate may comprise estimating the well path trajectory based on values of the inclination and azimuth of the well path at a plurality of points (e.g. survey points) along the well. The well path trajectory may also be based on the measured depth.

Survey points may also be known as survey station points or survey stations.

The values of the inclination may be based on navigation measurements from a downhole tool. The values of the inclination may be dependent on a position estimate derived from seismic data.

The values of the azimuth may be derived using a position estimate derived from seismic data.

The inclination may be the angle between the well path and the vertical axis (i.e. parallel to the depth axis). The azimuth may be the angle between the well path projected onto a horizontal, or lateral, plane and a reference direction. In this case, the Northing direction is used as the reference direction.

Location values for the well path may be plotted at a plurality of points spaced along the well path. These points may be survey points. Survey points may be spaced as regular or irregular intervals—e.g. measured depth intervals. As an example, survey points may be located at 30 m measured depth intervals along the well path.

The method may comprise using the well path estimate to predict the path that the well will take.

The method may comprise using the well path estimate to predict the path that the well will take ahead of the downhole tool.

The method may be used when drilling a well. The method may allow an operator to predict the path that the well will take ahead of a drill bit. The method for predicting the path that the well will take may comprise assuming that the current well path curvature is maintained. The method for predicting the path that the well will take may comprise predicting that the well path will follow the current curvature.

The minimum curvature method (described below) assumes that a well path between two points follows an arc of a circle. Predicting the path that a well will take may comprise assuming that this circle arc will continue to be followed.

The method may further comprise determining the well path estimate using the minimum curvature method with a parameter obtained using an optimisation process.

The optimisation process may obtain a plurality of parameters for determining the well path estimate using the minimum curvature method.

The parameter (or parameters) obtained using an optimisation process may be an azimuth value. The parameter (or parameters) obtained using an optimisation process may comprise an azimuth value The parameter (or parameters) obtained using an optimization process may be an inclination value. The parameter (or parameters) obtained using an optimization process may comprise an inclination value.

The optimisation process may comprise: determining a distance between a general definition of a well path modelled using the minimum curvature method and the position estimate derived from seismic data; and minimising an objective function based on the distance and starting from the navigation measurements to obtain the parameter for the well path estimate.

The general definition of a well path modelled using the minimum curvature model may be described by standard equations used to determine the well path given values of the measured depth, inclination, azimuth and a first well path point.

The distance may be a function. The distance may be expressed in terms of the parameters used in the minimum curvature method and values from the position estimate derived from seismic data. The distance may be expressed in terms of some or all of: measured depth, inclination, azimuth and seismic data position estimates.

The distance may be a lateral distance.

The distance may be a lateral distance when the optimisation process determines azimuth value(s) for the well path estimate.

The distance may be a vertical distance.

The distance may be a vertical distance when the optimisation process determines inclination value(s) for the well path estimate.

The distance may be an absolute distance.

The distance may be an absolute distance when the optimisation process determines both azimuth and inclination values for the well path estimate.

Determining the lateral distance between a general definition of a well path modelled using the minimum curvature method and the position estimate derived from seismic data may comprise: identifying an arc of the general definition of a well path modelled using the minimum curvature method that is closest to the position estimate derived from seismic data; projecting the position estimate derived from seismic data vertically on to the plane spanned by the arc; and using the geometry of the plane spanned by the arc to derive the minimum lateral distance between the position estimate derived from seismic data and the arc; using this derived minimum lateral distance as the lateral distance.

Where the distance is a lateral distance, the optimisation process may comprise minimising an objective function such as:

$$J(\phi_{minMD}, \ldots, \phi_N) = \sum_j d_j^2$$

Where $\phi_{minMD}$ is the azimuth value at the first survey point being considered, $\phi_N$ is the azimuth value at the last survey point being considered, and $d_j$ is the lateral, or absolute, distance derived as described above.

The minimisation of the objective function may be achieved using any known methods.

The navigation measurements from a downhole tool are used in the optimisation process.

Values from the navigation measurements may be used as a starting point for the optimisation process. Values of the azimuth and/or inclination and/or measured depth from the navigation measurements may be used in the optimisation process. Values of the azimuth and/or inclination and/or measured depth from the navigation measurements may be used as starting points for the optimisation process.

Using the minimum curvature method to determine the well path estimate may further comprise using a second parameter. The second parameter may be from the navigation measurements from a downhole tool. The navigation measurements from a downhole tool may also be used to determining the well path estimate using the minimum curvature method.

As noted above, the minimum curvature method requires azimuth, inclination and measured depth values. Where the optimization process is used to determine one or two of the parameters used in the minimum curvature method, the other parameters may be provided by navigation measurements from a downhole tool. The parameter obtained using an optimisation process may be combined with navigation measurements from a downhole tool to determine the well path estimate.

The minimum curvature method may use inclination values of the navigation measurements from a downhole tool. The minimum curvature method may also use measured depth values of the navigation measurements from a downhole tool.

The optimisation process may obtain only some—for example one, or two—of the parameters required to determine the well path. For example, the optimisation process may obtain only the azimuth value(s); in this case the navigation measurements for the inclination (and/or the measured depth values) may also be used to determine the well path estimate using the minimum curvature method.

In other examples the optimisation process may obtain the azimuth and inclination value(s); in this case the navigation measurements for the measured depth values may be combined with the parameters obtained from the optimisation to determine the well path estimate.

Where the position estimate derived from seismic data is used to improve the lateral and vertical accuracy of the well position estimate, both inclination and azimuth values may be identified that minimise an objective function as described above.

The change in azimuth and/or inclination values for the improved well path estimate compared to the navigation measurements from a downhole tool may be constrained. Where an optimisation process is used to identify azimuth and/or inclination values for the improved well path estimate, the range of azimuth and/or inclination values may be constrained around the corresponding navigation measurements from a downhole tool. For example, the range of azimuth and/or inclination values may be constrained based on the known accuracy of the measured values. As a specific example, the range of azimuth and/or inclination values may be constrained by an upper and lower bound with a value of ±0.74° around the azimuth and/or inclination values from the navigation measurements from a downhole tool.

The improved well path estimate may be calculated using the azimuth and/or inclination values determined using the optimisation process.

The minimum curvature method used in the present method may also use values of measured depth that are obtained by measurements in a known way, e.g. navigation measurements from a downhole tool.

In the present disclosure, a well trajectory determined using navigation measurements from a downhole tool is referred to as an initial well path estimate, or initial well position. The well path estimate determined using both navigation measurements and seismic data position estimates may be referred to as an "improved well position".

In other examples, the method may comprise: obtaining an initial well path estimate based on navigation measurements from a downhole tool. The method may further comprise using the position estimate derived from seismic data and the initial well path estimate to calculate an improved well path estimate. The well path estimate may be the improved well path estimate.

The initial well path estimate may embody the navigation measurements from a downhole tool.

The method may comprise receiving, or calculating, an initial well path estimate. The method may further include any of the following: receiving navigation measurements from a downhole tool, processing the navigation measurements from a downhole tool, using the navigation measurements from a downhole tool to calculate an initial well path estimate, and/or receiving an initial well path estimate based on navigation measurements from a downhole tool.

The initial well path estimate may be calculated from the navigation measurements from a downhole tool. Obtaining an initial well path estimate may comprise calculating an initial well path estimate using a minimum curvature method with values of the inclination and azimuth based on navigation measurements from a downhole tool.

The method may further comprise determining a measure of uncertainty of the well path estimate. The lateral measure of uncertainty of the well path estimate may be independent of a measured depth.

A vertical (or depth) measure of uncertainty of the well path estimate may be independent of a measured depth. When the vertical and lateral dimensions of the well path estimate are determined using position estimates derived from seismic data, the measure of uncertainty in the vertical and lateral dimensions may be independent of a measured depth.

The measure of uncertainty for a position estimate derived from seismic data is independent of depth and other position estimates. Accordingly, using the position estimate derived from seismic data provides an uncertainty profile that is not cumulative and does not increase with measured depth.

The measure of uncertainty may be calculated using a statistical distribution of residuals between the well path estimate and position estimate(s) derived from seismic data. A specific example of a suitable distribution may be the t-distribution.

The residuals may be hypothetical "distances" between the well path estimate and a position estimate derived from seismic data.

Determining a measure of the uncertainty may comprise calculating a single measure for the entire well path estimate using a statistical distribution of residuals between the well path estimate and position estimates derived from seismic data.

Alternatively, determining a measure of the uncertainty may comprise calculating a plurality of independent measures for different sections of the well path estimate using a statistical distribution of residuals between the well path estimate and position estimates derived from seismic data.

For example, a measure of uncertainty may be calculated for each well span between two consecutive survey points.

A single P % lateral uncertainty measure may be provided for the entire well path estimate (from an initial point, minMD) may be given by the following:

$$\text{Uncertainty}(P) = t\!\left(1 - (1-P)/2,\, M - (N - minMD + 1)\right) \sqrt{\frac{1}{M}\sum_{j=1}^{M} d_j^2}$$

where M is the number of position estimates derived from seismic data for the portion of the well being considered, N is the number of survey points along the well path, is the residual ("distance") between the position estimate derived from seismic data and the well path estimate, and t(P,df) gives the P % student distribution for df degrees of freedom.

A value of P=0.99 (99% uncertainty ellipse) may be used.

Calculating a measure of the uncertainty for a plurality of sections of the well path may be achieved by summing the $M_i$ position estimates derived from seismic data belonging to segment i, and $M_i-1$ degrees of freedom in t(P,df).

Deriving the position estimate from seismic data may comprise any of the methods described herein.

Deriving the position estimate from seismic data may comprise any, or all, of: a) collecting seismic data from a plurality of seismic sensors spread across a region of the surface of the Earth above a drill bit or other noise source and/or located in one or more nearby wells; b) pre-processing the seismic data to enhance a contribution of drill bit or noise source generated noise; c) defining a set of points on a grid in 3-dimensional space that includes an expected position of the drill bit or noise source; d) computing travel times for seismic waves from each said point to each seismic sensor location; e) for each said point, using the pre-processed seismic data, sensor location data, and computed travel times to compute a semblance stack of travel-time corrected seismic data in a time window; f) determining the grid location of the maximum semblance and fitting a 3-dimensional function around this grid location; and g) identifying the location of a maximum of the 3-dimensional function and using that as the estimate derived from seismic data.

Methods according to the disclosure may be used as part of a drilling operation.

The provision of a more accurate well path estimate allows a greater degree of reliability and control when drilling wells. A drilling operation may be updated or revised in light of a well path estimate provided by the present disclosure. A drilling operation may be optimised, or improved, by using the well path estimate. Methods according to the present disclosure may allow drilling parameters to be updated in light of a well path estimate in order to improve the accuracy of an ongoing drilling operation with respect to the desired well trajectory.

The presently-disclosed methods may be used for real-time geosteering. The well position estimate may be updated in real time during a drilling operation, allowing an operator to adjust drilling parameters responsive to the well position estimate.

Further according to the disclosure is a method of geo-steering, the method comprising: estimating a position of the well path using a method as described anywhere herein; and controlling a drill bit in response to the estimated position of the well path to follow a desired well trajectory.

Methods according to the present disclosure may be undertaken by a processor as part of a computer system. Accordingly, the present disclosure provides a system comprising a processor and storage device. The storage device comprising instructions that, when executed by the processor, cause the processor to perform a method as described herein According to the disclosure is a carrier medium comprising computer readable code configured to cause a computer to perform a method as described anywhere herein.

Further according to the disclosure is a computer program containing instructions that, when executed by a computer, cause the computer to perform the method described herein.

The methods may be computer-implemented methods. Since some methods in accordance with the present disclosure can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

According to the disclosure there is provided a method of estimating the current position of a drill bit or other noise source within a subsurface formation of the Earth. The method comprises the following steps: a) collecting seismic data from a plurality of seismic sensors spread across a region of the surface of the Earth above the drill bit or other noise source and/or located in one or more nearby wells; b) pre-processing the seismic data to enhance a contribution of drill bit or noise source generated noise; c) defining a set of points on a grid in 3-dimensional space that includes an expected position of the drill bit or noise source; d) computing travel times for seismic waves from each said point to each seismic sensor location; e) for each said point, using the pre-processed seismic data, sensor location data, and computed travel times to compute a semblance stack of travel-time corrected seismic data in a time window; f) determining the grid location of the maximum semblance and fitting a 3-dimensional function around this grid location; and g) identifying the location of a maximum of the 3-dimensional function and using that as an estimate of the current position of the drill bit or other noise source.

The estimate of the current position of the drill bit may correspond to a position estimate derived from seismic data.

The three dimensional function may be a second degree polynomial.

Steps a) to g) may be repeated for consecutive time windows to obtain an estimate of a well position and trajectory. The time windows may be overlapping or may be spaced apart in time.

The method may comprise passing a noise source along a pre-existing well to obtain an estimate of the well position and trajectory of the well.

The method may comprise drilling a new well with a drill bit of a drilling assembly.

The plurality of seismic sensors may be sensors of a permanent reservoir monitoring array and/or a temporary deployed array at the seabed, and/or downhole sensors in wells.

The plurality of seismic sensors may comprise conventional 4D sensors and/or fiber-optic DAS cables. Examples of suitable seismic sensors include geophones, hydrophones and accelerometers.

The pre-processing may comprise the use of a bandpass filter, an FX median filter, PZ-summation, and a subspace filter.

The time window may be between 20 and 120 seconds in duration.

Step g) may further comprise additionally identifying a value of said maximum and using that to determine a noise level at said drill bit or other noise source.

Preferred embodiments of the disclosure will now be described, by way of example only, with reference to the accompanying drawings.

BRIEF DESCRIPTION OF FIGURES

FIGS. 10A through 10D show positions derived from seismic data, an initial well path estimate, an improved well path estimate, an uncertainty ellipse for the initial well path estimate and an uncertainty ellipse for the improved well path estimate for an exemplar well;

DETAILED DESCRIPTION

FIGS. 1 to 6 generally demonstrate methods for deriving position estimates from seismic data, for use in the present disclosure.

A method of estimating the current position of a drill bit or other noise source within the drill string or bottom hole assembly (BHA) or in a subsurface formation of the Earth is described below. This method may provide the position estimate derived from seismic data used methods for estimating a well position.

The proposed method tracks noise from drilling operations or other noise sources within passive seismic data. The data is analysed to obtain independent measurements of a well position, which do not suffer from an accumulation of error with measured depth. This allows the well path to be localized laterally with a higher accuracy than can be obtained with conventional gyroscopic and magnetic measurements. For a horizontal well 6500 m in length for example, the lateral positional uncertainty of the well path may be reduced from over 60 m to approximately 15 m. The proposed method supports improved well placement by reducing the lateral position uncertainty while drilling, in real time. The risk of adverse events, e.g. drilling infill wells too close to already existing producers or hazard zones such as faults, gas pockets, stringers etc, may also be reduced.

Permanently-deployed reservoir monitoring (PRM) arrays provide continuous background noise recordings, amounting to Terabytes of passive seismic data every day. Passive data can, therefore, be measured using an existing PRM system. Hence for PRM-equipped fields, the method provides accurate, complementary information at minimal extra costs, for real-time well positioning that can be used for decision making during drilling operations.

The method for providing a position estimate derived from seismic data is based on computing, using a known semblance analysis technique, the semblance stack of passive seismic data. The stack is computed along travel time curves from each grid point in a subsurface volume to selected seismic sensors at the seabed (or land surface). The method can also be used for detecting sudden, transient drilling issues (e.g. liner failure) and drilling-induced events in the analysed subsurface volume.

Figure 1:
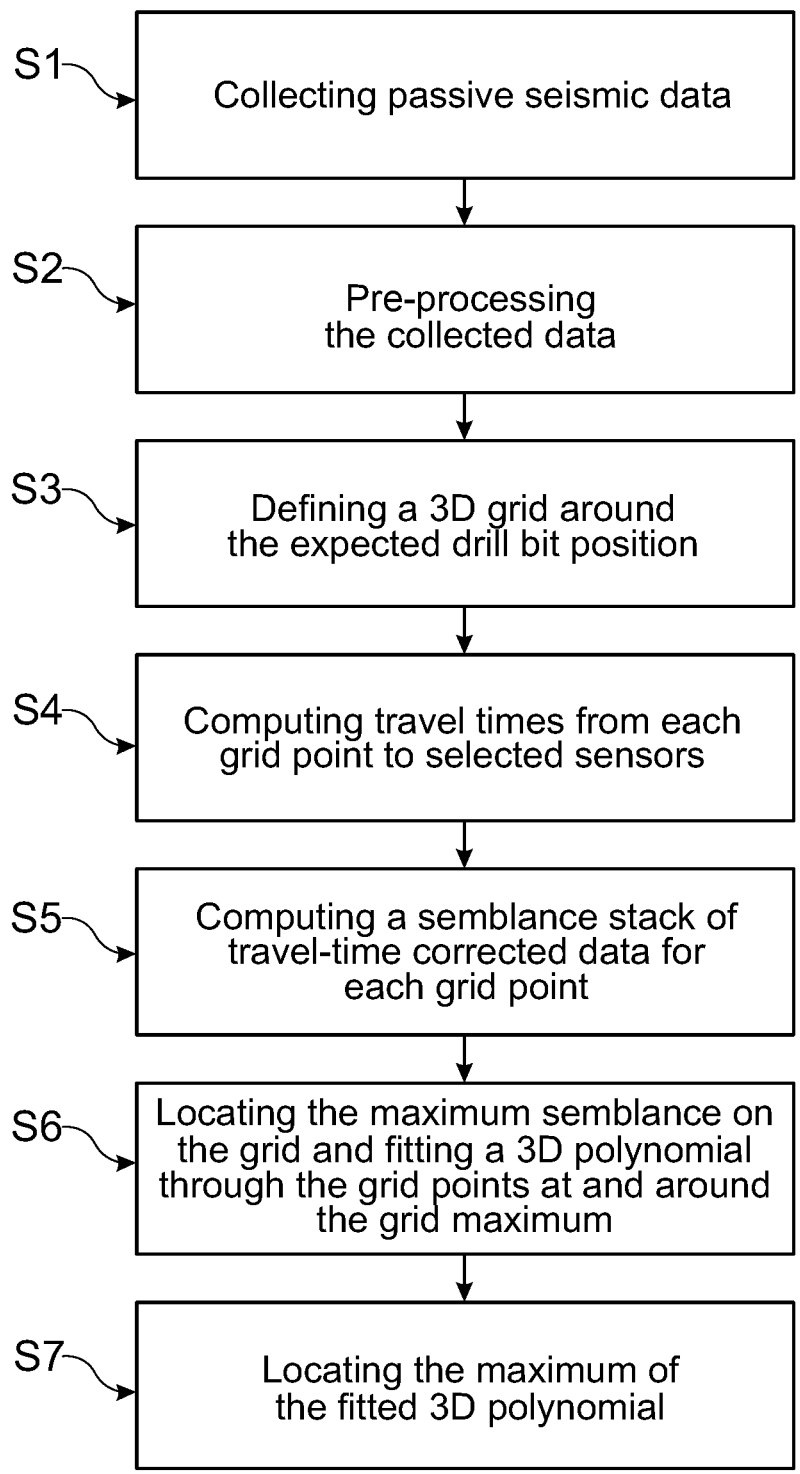
FIG. 1 is a flow diagram which illustrates the general steps of deriving a position estimate from seismic data.

FIG. 1 is a flow diagram illustrating the general steps of the sub-surface well location determination method. The method comprises the steps of:

S1) Collecting passive seismic data;
S2) Pre-processing the collected data;
S3) Defining a 3D grid around the expected drill bit position;
S4) Computing travel times from each grid point to selected sensors;
S5) Computing a semblance stack of travel-time corrected data for each grid point;
S6) Locating the maximum semblance on the grid and fitting a 3D polynomial through the grid points at and around the grid maximum; and
S7) Locating the maximum of the fitted 3D polynomial.

Figure 2:
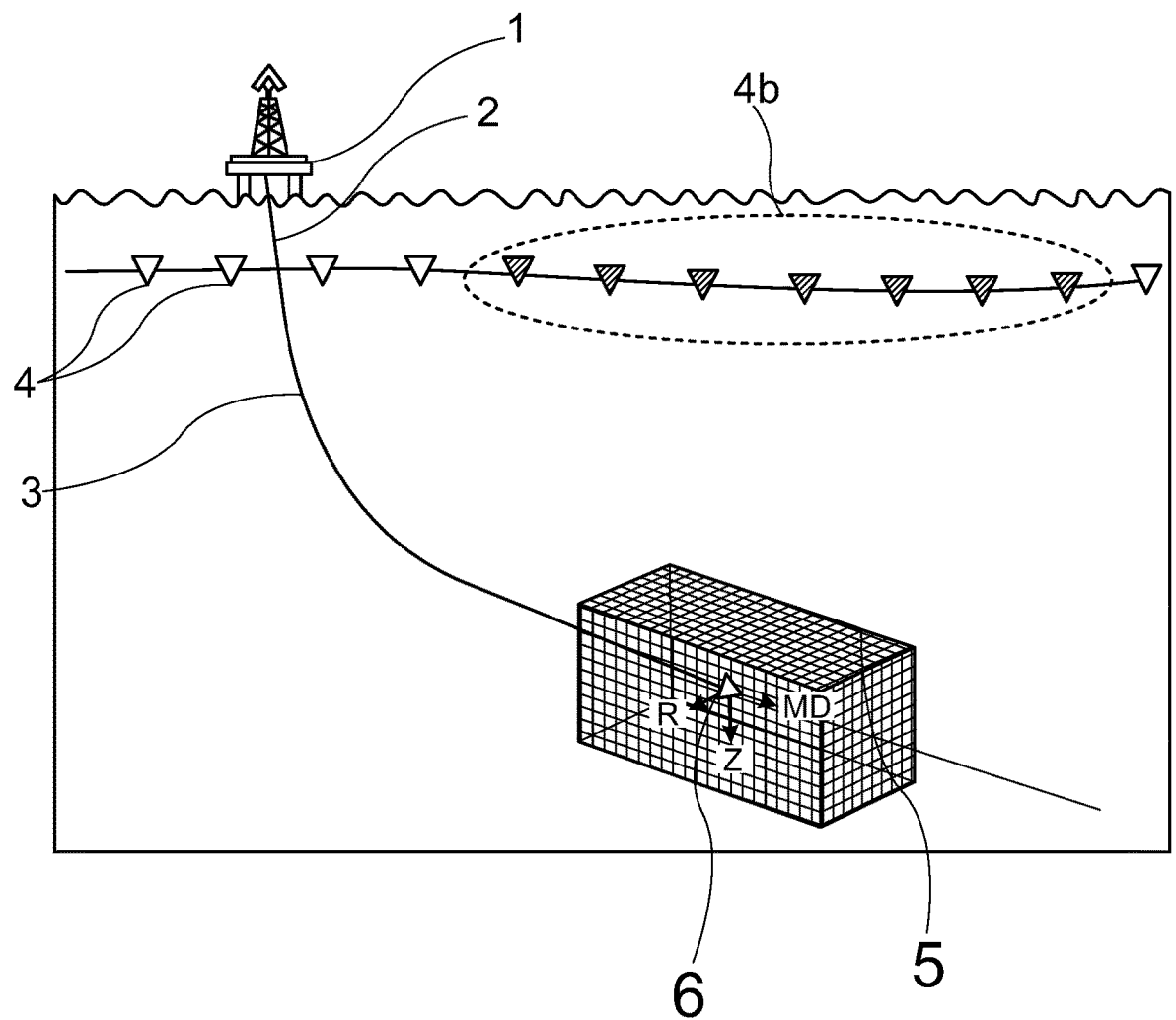
FIG. 2 illustrates schematically a procedure for estimating the position of a drill bit whilst drilling a subsea well using subsea data.

This method is further illustrated in FIG. 2, which shows an offshore drilling platform 1, with a drill string 2 extending from the platform into a well 3 extending through the subsurface formation.

In S1, sensors 4, which may be part of an existing permanently-deployed reservoir monitoring (PRM) array, are used to collect passive seismic data. Such an array may be primarily used, in a known way, for periodic 4D seismic monitoring of a reservoir and the overburden. A known system has been developed, for example, to use passively monitored seismic data for detecting and locating microseismic events induced by injection into wells (Bussat et al., 2016, Bussat et al., 2018) to support safe operations and prevent out-of-zone injection. The sensors 4 may be of a conventional or fibre-optic distributed acoustic sensing (DAS) type. This known PRM array, and the data it provides, is used in a new way to track the well location.

Typically, for periodic microseismic monitoring by semblance analysis, a temporal semblance window is defined. Passive data collected with the sensors is processed and stacked over the sensors and the semblance window for semblance analysis. In the present case, since the drilling operation (or other noise generating process) is expected to produce a continuous signal, a longer semblance window is used compared to that used for conventional microseismic monitoring. The window should be sufficiently long to be able to pick up the continuous but rather weak noise, but sufficiently short such that the drill bit does not move substantially, which would cause the image of the noise source to be blurred. Although the present example relates to the noise emitted from a drill bit, it is understood that in alternative examples the noise may instead be emitted from an alternative noise source. An example of a suitable semblance window is in the range of to 120 seconds in duration depending on drilling parameters, for example 90 seconds to scan through the passive data.

In alternative examples, the window may be between 5 and 300 seconds in duration.

As well as the noise from the drill bit, the passive seismic data contains noise from a range of different sources that are not of interest for the positional monitoring, such as interference from nearby seismic acquisitions, noise from the platform, and noise from vessels in the neighbourhood. To be able to track the drilling noise therefore, the passive data is pre-processed after collection (S2). This may be achieved by the use of a bandpass filter, an FX median filter, PZ-summation, and a subspace filter prior to computing the semblance. Except for the bandpass filter, the filters are data-driven; that is, filter parameters are computed continuously during operation. The parameters for these filters can, therefore, be optimized for the noise present in the data at any given time. By appropriate pre-processing, a significant amount of background noise is removed from the passive data.

For each time interval corresponding to the semblance window length, a processing grid that covers a limited monitoring volume around the current expected drill bit position 6 is then defined (S3), as shown in FIG. 2. The method by which the initial expected position is obtained is not limited, although this may be known from the well-planning phase in combination with the current length of the drill string. Conventional magnetic MWD or gyroscopic techniques may be used to estimate the drill bit position more accurately. The estimate may then be stored in a database, along with real-time drilling parameters such as rate of penetration (ROP) and bit rotations per minute (RPM). The expected position is fetched for the construction of the processing grid. The spatial extent of the monitoring volume should be large enough to cover possible revisions of the planned well path, and the grid spacing can be relatively coarse. For example, the extension of the volume may be ±200 m along the well path (MD axis) with 20 m grid spacing, and ±80 m laterally (R axis) and 140 m vertically (Z axis) away from the well path with 20 and 35 m grid spacing, respectively.

P-wave travel times between the sensors 4 and all points on the processing grid are then obtained (S4), for example by ray tracing or wavefield modelling through a velocity model. For this step, an optimal subset 4b of the available PRM nodes may be selected and used for a given expected drill bit position. The selected nodes may be, for example, all nodes within an area centred above the drill bit with a radius equal to the current vertical depth of the drill bit. By reducing the amount of data for analysis, both in terms of the number of sensors and in terms of the number of grid points on the processing grid, the amount of computational power and computational time required for processing is reduced. The travel times are then used to travel time-correct the seismic data (the vertical component of the geophone after pre-processing). For each grid point on the processing grid, the travel time-corrected data from the selected nodes are then stacked to compute the semblance by known methods (S5). This procedure may be repeated for consecutive semblance windows, whether or not partially overlapping, with a potentially new optimal subset of receivers.

The location and value of the maximum semblance on the processing grid is then determined (S6). The finer the grid, the higher the positional precision achieved. A finer grid, however, requires higher computational power and longer computational time. Therefore, to obtain sub-grid resolution, in particular when using a relatively coarse processing grid, the exact location of the maximum semblance and its value may be estimated by fitting a second-degree polynomial in 3D through the 3×3×3 grid points around the grid maximum. A coarse grid used in combination with this 3D fitting gives very similar results to a finer grid, and is much faster to compute. This is an important benefit for real-time implementation and positional decision-making.

The resulting estimates (fitted maximum semblance position and value) may then be stored in a database, together with the median semblance value on the grid to represent the background noise level. When the estimated location in any direction is far from the maximum semblance on the grid, it is a sign of low-quality data without a clear maximum in the semblance volume. For example, when the estimated location in any direction is farther than one grid point away from the grid point with maximum semblance. Any such observations may be flagged as 'bad data' and replaced with their original maximum value and location on the grid. The value of the fitted maximum semblance, or, if replaced in case of bad data, the original grid maximum, may be used as a measure of the amount of noise detected from the drilling operation. The position of the maximum of the 3-dimensional polynomial or, if replaced in the case of bad data, the original grid position of the maximum, may be used as the estimate for the location of the noise source, i.e. the current position of the drill bit or other noise source in the BHA (S7).

Figure 3:
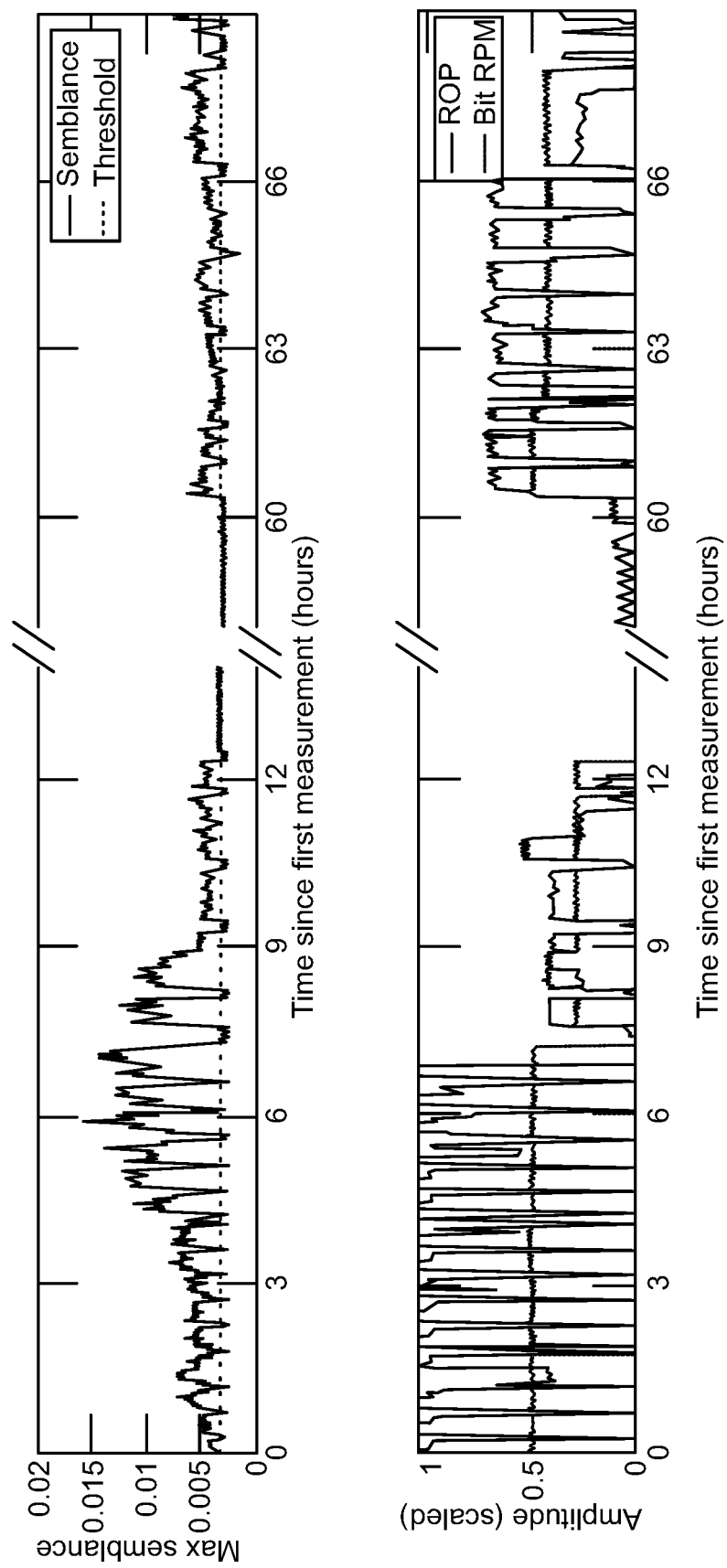
FIG. 3 shows, for an exemplary well, the observed maximum semblance value and the rate of penetration (ROP) and rotations per minute (RPM) of the drill bit as a function of time.

FIG. 3 shows results collected from an exemplary well, where a bandpass filter, an FX median filter, PZ-summation, and a subspace filter have been applied to the passive data. The lower panel shows the rate of penetration (ROP) (upper trace) and rotations per minute (RPM) (lower trace) of the drill bit as a function of time. The upper panel shows the observed maximum semblance value, also as a function of time. The data for both panels is aligned along a common time scale for comparison. There is a clear correlation between maximum semblance and drill bit activity. When the drill bit is rotating and advancing (ROP>0), the semblance is high, while the semblance is low when drilling is paused (these low semblance values are typically flagged as bad data). This confirms that the detected noise comes from the drilling operation, and the pre-processing preserves the drilling noise.

Figure 4:
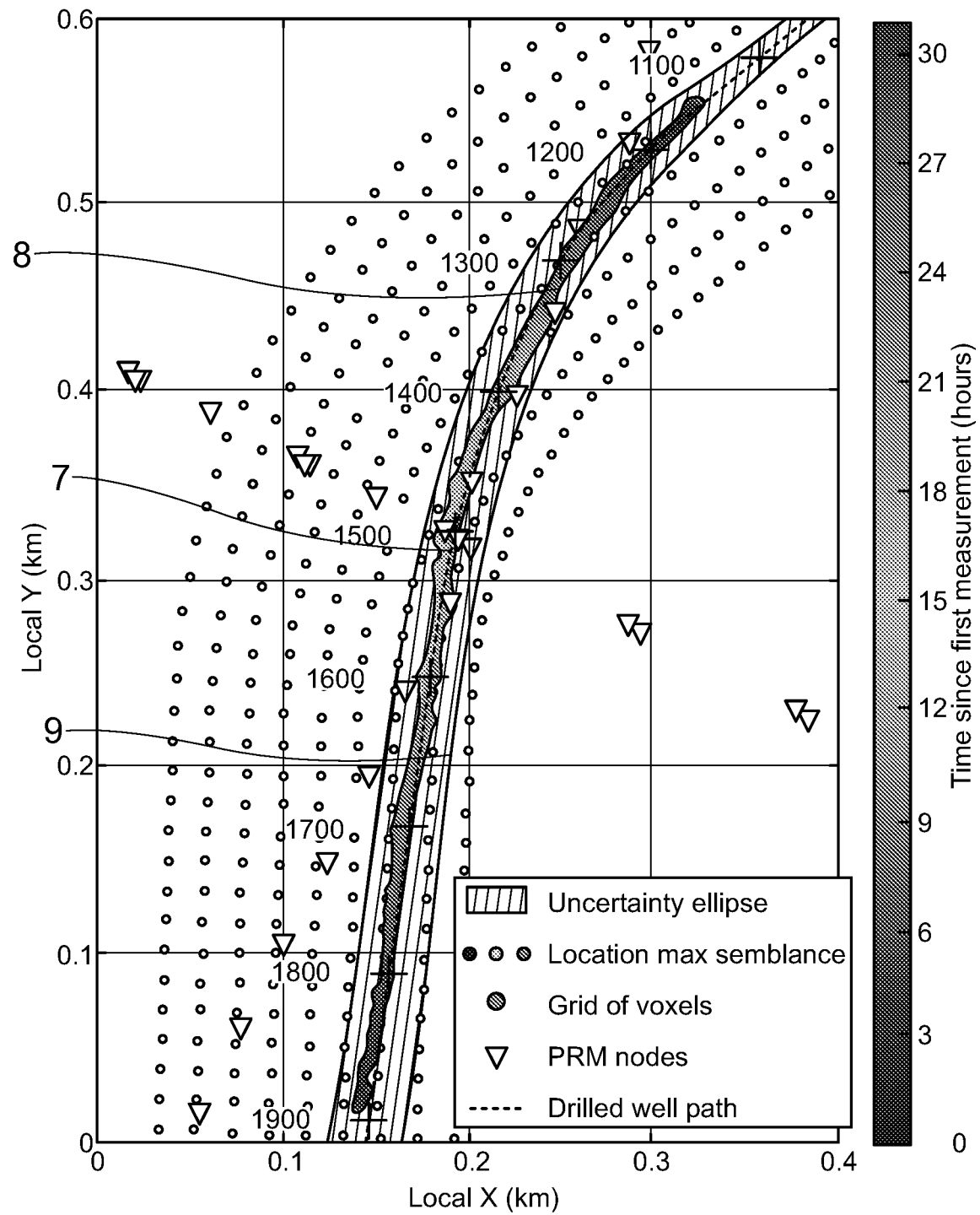
FIG. 4 shows the maximum semblance position for an exemplary well at a measured depth of approximately 1500 m.
Figure 5:
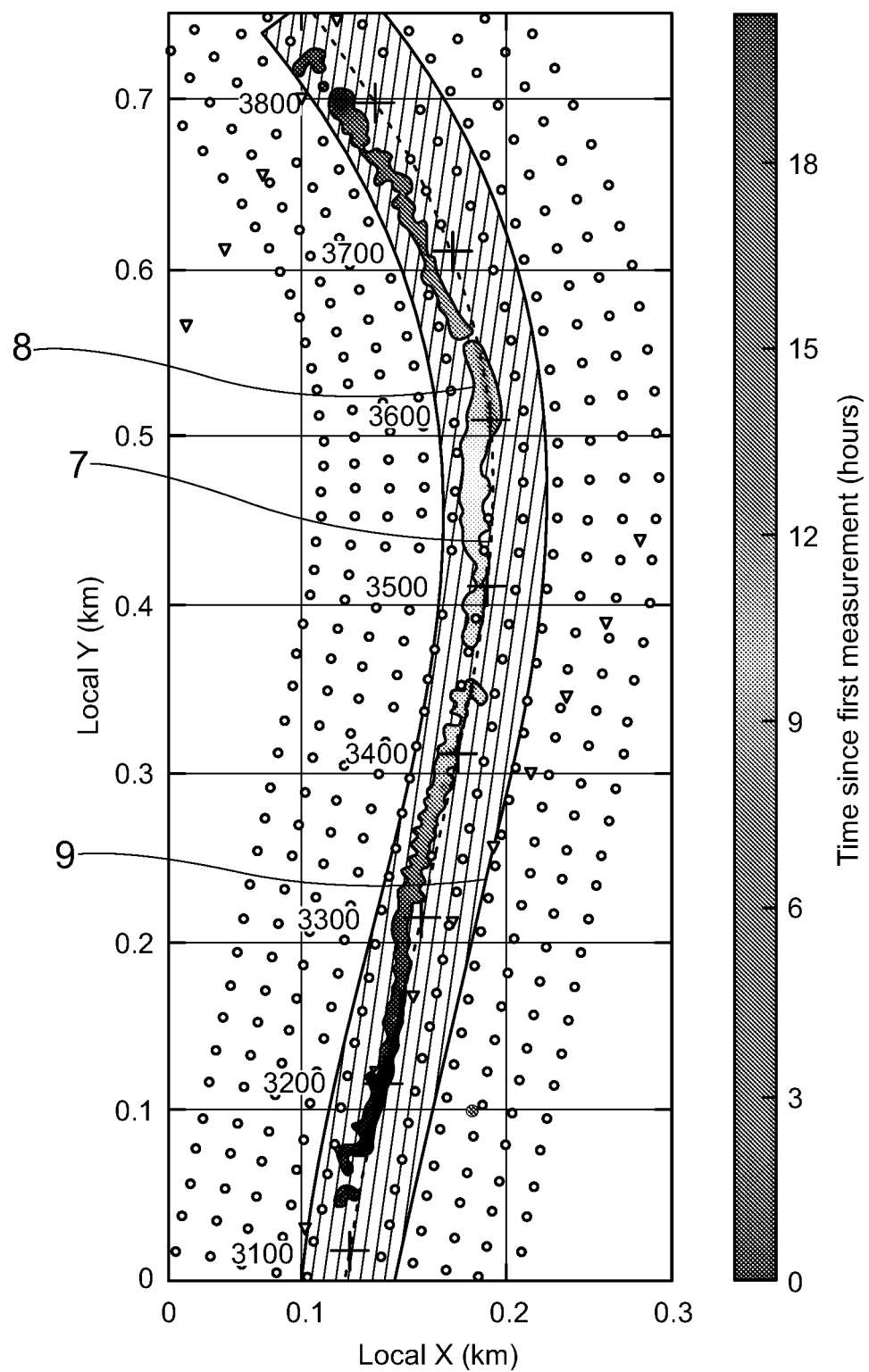
FIG. 5 shows the maximum semblance position for an exemplary well at a measured depth of approximately 3500 m.
Figure 6:
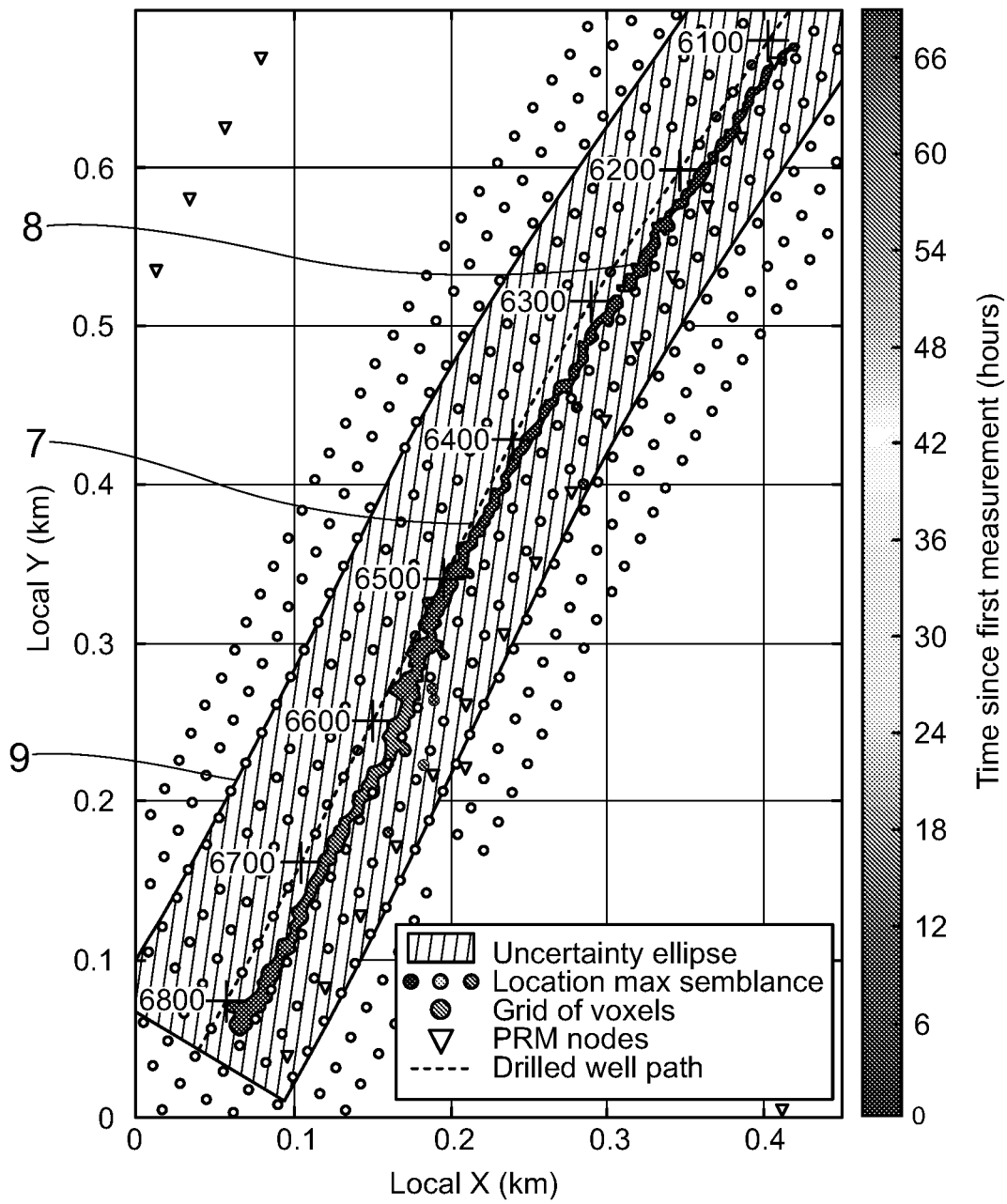
FIG. 6 shows maximum semblance position for an exemplary well at a measured depth of approximately 6500 m.

FIGS. 4-6 show results of the maximum semblance positions obtained for three wells (at approximately 1500, 3500, and 6500 m along the length of the well path respectively) after carrying out the method as described. Each of the figures shows a map view of the estimated drilled well path 7 and corresponding 95% uncertainty ellipse 9 from gyroscopic measurements. The fitted location of the maximum semblance 8 for 90 second intervals of data, the grid points at which the semblance is computed, and the PRM nodes, are plotted. Threshold values for the semblance and signal-to-noise ratio (SNR) (represented by maximum divided by median semblance) and the 'bad data'-flag are used to filter measurements before plotting. Over time, the observations are located at increasing measured depth (length along well path), following the progress of the drilling.

FIGS. 4-6 show that the lateral extent of the error ellipse 9 for the gyroscopic measurements for horizontal wells increases from less than 10-15 m at around 1500 m measured depth (FIG. 4) to over 60 m at 6500 m measured depth (FIG. 6). The position of the (filtered) maximum semblance 8 obtained by the method described above is close to the drilled well path 7, as estimated by gyroscopic measurements, and well within the corresponding uncertainty ellipse. The lateral spread of the observations, however, shown by the spread of the region 8, is far smaller than the width of the error ellipse for the gyroscopic measurements, and is independent of measured depth (that is, independent of the position along the well path). This indicates that the passive data can be used to reduce the lateral well positional uncertainty significantly, by approximately a factor 4 for a 6500 m long well, compared to the gyroscopic measurements. The reduction in uncertainty may be even higher during favourable (quiet) ambient noise conditions.

Instead of the drill bit, any other suitable source may be used to produce the noise used for localisation. For example, an acoustic source may be gradually lowered into an already drilled well whilst generating noise. Such alternative noise sources may be introduced to the well bore alone, or they may be introduced by equipment to be used for other downhole operations, for example cement bond logging tools. In this way, the cost of operation would be reduced. Furthermore, additional noise sources may be used simultaneously with a drill bit. This may, for example, be used to supplement the noise produced by the drill bit during operation, and could be useful in situations where the noise reaching the surface sensors from the drill bit itself is weak or insufficient for proper localisation.

Instead of a permanently-deployed PRM system, the method can also be used with temporarily deployed cables. This method may be also used to provide depth estimates for the noise source. Depth estimates may be improved by including passive data from sensors (conventional sensors or a fiber-optic DAS systems) which are located downhole in the same or one or more nearby wells as well as from those at the surface. It is further noted that, by reducing the semblance window length, this method may also be used to detect sudden, transient, drilling-related events.

The above-described method provides a position estimate for a drill bit or an associated well path, derived from seismic data.

The present disclosure provides a method of estimating a position of a well path within a subsurface formation of the Earth comprising calculating a well path estimate using navigation measurements from a downhole tool and a position estimate derived from seismic data. Accordingly, in the examples of the present disclosure described below, the position estimate derived from seismic data is combined with navigation measurements from a downhole tool to calculate a well path estimate.

Figure 7:
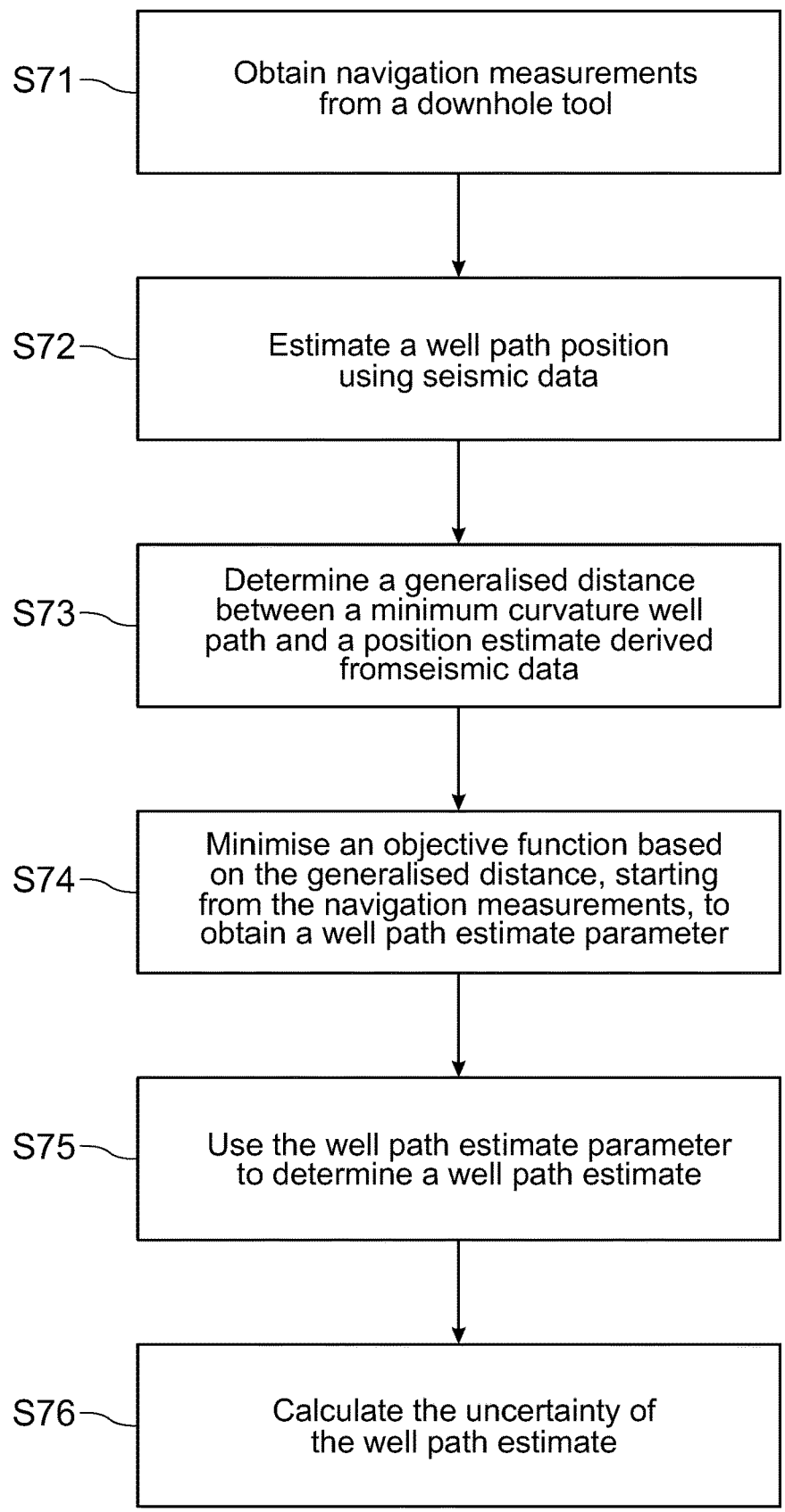
FIG. 7 is a flow diagram which illustrates the actions for estimating a position of a well path according to the disclosure.

Turning now to FIG. 7, an overview of a method according to the disclosure is shown.

The method shown in FIG. 7 comprises:
S71—Obtain navigation measurements from a downhole tool;
S72—Estimate a well path position using seismic data;
S73—Determine a generalised distance between a minimum curvature well path and a position estimate derived from seismic data;
S74—Minimise an objective function based on the generalised distance, starting from the navigation measurements, to obtain a well path estimate parameter;
S75—Use the well path estimate parameter to determine a well path estimate; and
S76—Calculate the uncertainty of the well path estimate.

While FIG. 7 shows steps S71 to 76 as sequential actions, it is to be understood that this is only for illustration. In practice, certain actions may be undertaken in alternative orders, or undertaken simultaneously.

Navigation measurements from a downhole tool are obtained in S71. These measurements may be obtained directed from a downhole tool, or provided by a third party. These measurements may, in some examples, be provided in the form of a well path trajectory calculated using the navigation measurements—this will be referred to herein as an initial well path estimate. An initial well path estimate, as used here, refers to an estimated well trajectory derived from navigation measurements from a downhole tool (i.e. without use of seismic data position estimates).

Example navigation measurements include inclination, azimuth and measured depth values. The navigation measurements are readings from, or derived from readings from, magnetic and/or gyroscopic sensors in a drill bit or other downhole tool, as well as the measured depth (which may be considered as the length of the wellbore). These magnetic and/or gyroscopic measurements may be filtered, processed or otherwise 'cleaned-up' prior to use (e.g. to calculate the initial well path estimate).

In the examples described herein, an initial well path estimate calculated from the navigation measurements from a downhole tool is calculated using the minimum curvature method. The minimum curvature method is also used to determine the well path estimate, as described above. The minimum curvature method is described in "A compendium of directional calculations based on the minimum curvature method", Sawaryn & Thorogood, SPE 2005 Drilling & Completion.

Figure 9A:
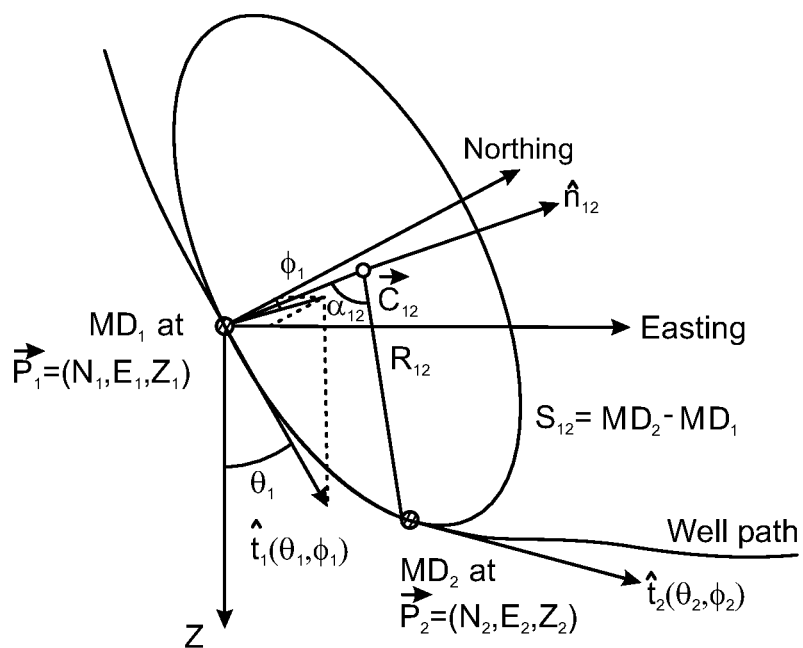
FIGS. 9A and 9B schematically illustrate minimum curvature methods for estimating well path positions.

FIG. 9A schematically illustrates the minimum curvature method. In brief, calculating the initial well path estimate using measurements from the downhole tool and the minimum curvature method comprises assuming that the well path between two consecutive survey points is a circular arc, and that this arc is defined by the position at the first survey point, the inclination and azimuth angles at the two survey points and the measured depth (MD) difference between the two survey points. Using this method and the measurements of the inclination, azimuth and measured depth from the downhole tool, an estimate for the locations of each sequential survey point along the well path can be calculated. This estimated well path based on inclination, azimuth and MD values from the navigation measurements is referred to herein as the initial well path estimate.

Using the minimum curvature method, any point on the circular arc, and thus the absolute location of any point along the well path can be calculated.

The minimum curvature method will now be very briefly described with reference to FIG. 9A. As noted above, the estimated well trajectory is completely defined by the spatial location (e.g. Northing coordinate, Easting coordinate, depth coordinate $(N_0, E_0, Z_0)$) at $MD=MD_0$ together with a list of (MD,Inclination($\theta$),Azimuth($\varphi$)) values measured at specific points (i) along the entire length of the well path, referred to as survey points or station survey points (starting at $MD=MD_0$). The typical distance between survey points is around 30 m, but this may be greater or less in certain cases.

The inclination ($\theta$) is the angle between the estimated well path and the vertical axis; and the azimuth ($\varphi$) is the angle between the estimated well path, projected on a horizontal (lateral) plane, and the Northing axis.

The azimuth and inclination define the tangential unit vector along the estimated well path at the survey point i: $\hat{t}_i = (\sin \theta_i \cos \varphi_i, \sin \theta_i \sin \varphi_i, \cos \theta_i)$.

The minimal curvature method assumes that the estimated well path between two consecutive survey points (i, i+1) is a circular arc completely defined by the position $(N_i, E_i, Z_i)$ at survey point i, the tangential vectors $\hat{t}_i$ and $\hat{t}_{i+1}$ at i and i+1, and the MD difference $S_{ii+1}=MD_{i+1}-MD_i$ (which is considered to be the arc length).

With given position at $MD_0$ and the list $(MD_i, \theta_i, \varphi_i)$ all points $(N_i, E_i, Z_i)$ along the estimated well path can be uniquely computed. As such, the position $(N_0, E_0, Z_0)$ at $MD=MD_0$ and list $(MD_i, \theta_i, \varphi_i)$ define the estimated trajectory of the well path.

Using this method, the initial well path estimate is obtained.

Referring to the figure, the following is provided, for clarity.

The angle arc angle $\alpha_{12}$ is given by:

$$\alpha_{12} = 2 \sin^{-1}\left\{\sqrt{\left[\sin^2\left(\frac{\theta_2 - \theta_1}{2}\right) + \sin\theta_1 \sin \theta_2 \sin^2\left(\frac{\phi_2 - \phi_1}{2}\right)\right]}\right\}$$

$$R_{12} = \frac{S_{12}}{\alpha_{12}}$$

where $R_{12}$ is the radius and $S_{12}$ is the arc length and $\alpha_{12}$ is in radians (although where a small a straight line approximation may be used, resulting in different formulae as described in "A compendium of directional calculations based on the minimum curvature method", Sawaryn & Thorogood, SPE 2005 Drilling & Completion.)

$$\hat{n}_{12} = \frac{\hat{t}_1 + \hat{t}_2}{\sin(\alpha_{12})}$$

where $n_{12}$ is the normal vector $$\vec{C}_{12} = \vec{P}_1 - R_{12}(\hat{t}_1 \times \hat{n}_{12})$$

where $C_{12}$ is the location of the centre of the circle and $P_1$ is the location of the first survey point being considered (at $MD_1$)

$$\vec{P}_2 = \vec{P}_1 + \frac{S_{12}}{\alpha_{12}}\tan\left(\frac{\alpha_{12}}{2}\right)(\hat{t}_1 + \hat{t}_2) \text{ and}$$

where $P_2$ is the location of the second survey point being considered (at $MD_2$).

Turning back to FIG. 7, in S72, an estimate for a well path position is obtained using seismic data. In this example, a plurality of points, each representing an estimate for the well path position, are provided using seismic data. This plurality of points are provided using the method described above with reference to FIGS. 1 to 6.

Before providing the well path estimate it must be decided the minimum MD from which the improved well path estimate should be calculated (minMD). This may be from the start of the wellbore (e.g. MD=0), or at a specified measured depth. This may be selected by an operator, for example.

The minimum curvature method is used to determine the well path estimate. In order to determine the well path estimate using the minimum curvature method, values for the inclination, azimuth and measured depth are required (as well as the location of the well path estimate starting point). At least one of these values will be obtained using an optimisation process based on the seismic data position estimates. The navigation measurements will be used as starting points for the optimisation process.

In certain embodiments, both the inclination and azimuth may be obtained using an optimisation process based on the seismic data position estimates. However, in the present example only the azimuth values will be obtained using an optimisation process.

In S73, a generalised distance between a general definition of a well path defined using the minimum curvature method and a position estimate derived from seismic data is determined. This distance will be the function that is optimised to obtain the well path estimate.

In the present example, the estimated well path positions derived from the seismic data are known to be accurate with regard to their lateral location, but have a larger spread in the vertical, or depth, dimension. The estimated lateral position of the well path derived from seismic data is more accurate than that calculated using magnetic and/or gyroscopic measurements from the downhole tool. As such, the well path positions estimated from seismic data are used to determine the lateral component of the well path estimate (also referred to herein as an "improved well path estimate").

The estimated depth and inclination of the well path estimate are determined using the navigation measurements from the downhole tool, because in this specific case the depth and inclination estimates derived using magnetic and/or gyroscopic measurements from the downhole tool are more accurate than those provided by the seismic data well position estimates.

Accordingly, the lateral position component of the improved well path estimate is derived using the position estimates from seismic data, and the vertical position component of the improved well path estimate is derived using navigation measurements from a downhole tool.

Figure 8:
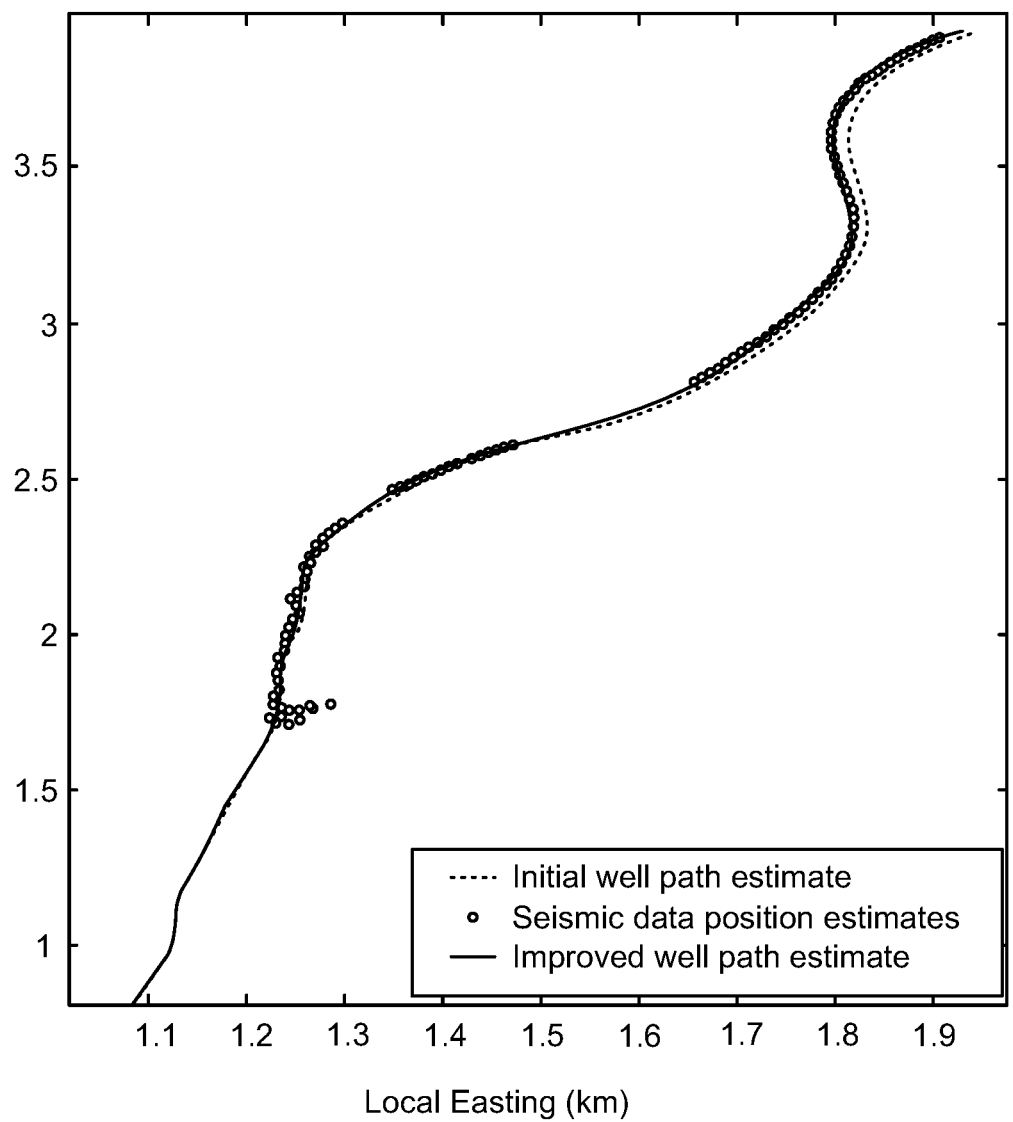
FIG. 8 shows positions derived from seismic data, an initial well path estimate and an improved well path estimate.

FIG. 8 shows the initial well path estimate derived from the navigation measurements, position estimates derived from seismic data and the improved well path estimate, in a horizontal plane.

In FIG. 8, the improved well path estimate is seen to follow the position estimates derived from seismic data in a lateral dimension (e.g. in a horizontal plane). The position estimates derived from seismic data are known to be more accurate in a lateral dimension than those obtained from magnetic and/or gyroscopic measurements. One reason for this is that inaccuracies are cumulative when using navigation measurements from a downhole tool, whereas each data point is independent when using position estimates derived from seismic data, and so inaccuracies are not cumulative.

For these reasons, in the present example the lateral distance between a generic definition of a well path and a position estimate derived from seismic data is used for the optimisation process, so as to capture the lateral accuracy of the seismic data locations while relying on the navigation measurements for the vertical component. In particular, the lateral distance is used to generate an objective function that is minimised to determine a parameter for the well path estimate.

Once an equation for the lateral distance is derived, an objective function incorporating the distance can be optimised to determine the lateral component of the (improved) well path estimate.

Figure 9B:
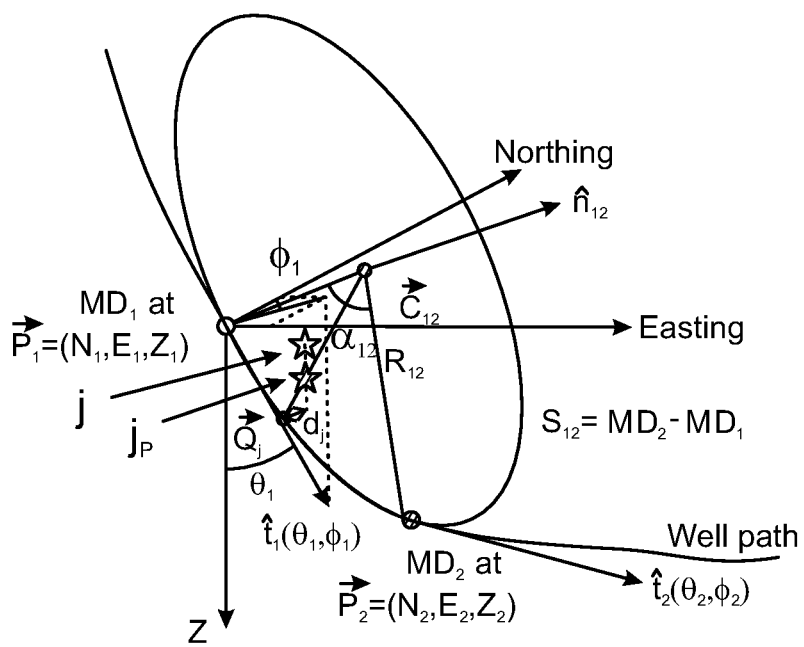

FIG. 9B schematically illustrates the method by which an expression for the lateral distance between the generic definition of a minimum curvature well path and the seismic data position estimate is obtained.

As discussed above, a plurality of seismic data position estimates are provided. The below method will be discussed with respect to a single seismic data position estimate j. In practice, the following method will be undertaken for a plurality, or all, of the seismic data position estimates.

In order to obtain a formula for the distance between a general definition of a well path modelled using the minimum curvature method and the position estimate derived from seismic data, the nearest two survey points $P_1$, $P_2$ along the general definition of a well path are identified for the seismic data position estimate j. The arc $S_{12}$ between these two survey points $P_1$, $P_2$ is identified as the closest arc segment to the seismic data position estimate j. The position estimate j is associated with this arc $S_{12}$. When undertaking this method for a plurality of seismic data position estimates, each will be associated with its nearest arc.

The seismic data position estimate j is projected vertically in the plane spanned by the circle associated with arc $S_{12}$—this projected point is shown as $j_P$.

The seismic data position estimate j and has a position $(n_j, e_j, z_j)$ and the projected seismic data position $j_P$ has a position $(n_j, e_j, z_{j,proj})$, where $$z_{j,proj} = \frac{\left(\vec{P}_1 \cdot \hat{n}_{12} - n_j\, n_{12}(1) - e_j\, n_{12}(2)\right)}{n_{12}(3)}$$

$$\vec{Q}_j = \vec{C}_{12} + R_{12} \cdot \frac{\left(\vec{C}_{12} - (n_j, e_j, z_{j,proj})\right)}{\left|\vec{C}_{12} - (n_j, e_j, z_{j,proj})\right|}$$

where $Q_j$ is the point on the arc closest to the projected point $j_P$ and $$d_j = \sqrt{(Q_j(1) - n_j)^2 + (Q_j(2) - e_j)^2}$$

This allows us to derive the lateral distance between the well path and the seismic data position estimate in terms of the parameters used to define the minimum curvature well path and the seismic data position estimates.

To obtain the azimuth values for the (improved) well path estimate, an optimisation process is used to minimise an objective function based on the sum of the lateral distances of a plurality of seismic data position estimates and thus, effectively, find the azimuth values for the best well path estimate that passes through the seismic data position estimates. To achieve this, an optimisation procedure is employed, to minimise an objective function based on generalised definition of the lateral distances $d_j$ (i.e. between the seismic data position estimates and the associated arc of the generic definition of a minimum curvature well path).

The optimisation process starts with the navigation measurements from a downhole tool, S74. By starting with the azimuth values from the navigation measurements, and optimising this function with respect to the azimuth values, optimised azimuth values are calculated to fit the (improved) well path estimate to the position estimates derived from seismic data in the lateral plane.

The improved well path estimate is calculated using these values.

In this example, an optimising procedure is used to minimize the objective function:

$$J(\phi_{minMD}, \ldots, \phi_N) = \sum_j d_j^2$$

Where N is the number of survey points along the well path, $(\varphi_{minMD}, \ldots, \varphi_N)$ are the azimuth values for each of the survey points from minMD to N with $\varphi_{minMD}$ being the azimuth value at the first survey point being considered and $\varphi_N$ being the azimuth value at the last survey point being considered, and $d_j$ is the lateral distance between the seismic data position estimate j and the closest point on the generic definition of a minimum curvature well path estimate (i.e. arc $S_{12}$).

The azimuth values $\varphi_l$ are constrained, for example with an upper and lower bound around the navigation measurements from a downhole tool. The upper and lower bound may be determined by the uncertainty associated with the measurements (e.g. the gyroscopic measurements) of the downhole tool. In the present example, the upper and lower bounds for the azimuth are ±0.74° around their measured value.

In the present example the objective function is based on the lateral distance (residual) between the, or each, seismic data position estimate and the minimum curvature well path estimate. However, in alternative examples where the initial well path estimate is optimised with respect to both the azimuth and inclination, the objective function may be based on the total distance vector (i.e. including both depth, northing and easting dimensions) between the position estimate derived from seismic data and a general definition of a well path modelled using the minimum curvature method.

Once azimuth values are obtained from the optimisation process, they are used—together with inclination and measured depth values from navigation measurements from a downhole tool—to calculate a well path estimate using the minimum curvature method, as outlined in S75.

Once the optimisation process is complete and the improved well path estimate has been calculated, a measure of the uncertainty is calculated, S76.

The measure of the uncertainty for the improved well path estimate is calculated for the improved well path estimate from the minimum MD from which the improved well path estimate was calculated (minMD). For sections of the well where an improved well path estimate is not provided, the uncertainty measurement (e.g. the uncertainty ellipse) for the initial well path estimate is used (which may be derived from the uncertainty inherent in the measurements from the downhole tool).

Any suitable statistic distribution may be used to provide a measure of the uncertainty. In the present case, the uncertainty is measured using the student distribution. The global P % lateral uncertainty ellipse along the improved well path estimate (from minMD) is given by the constant value as follows:

$$\text{Uncertainty}(P) = t(1 - (1 - P)/2, M - (N - minMD + 1)) \sqrt{\frac{1}{M} \sum_{j=1}^{M} d_j^2}$$

where M is the number of position estimates derived from seismic data for the portion of the well being considered and t(P,df) gives the P % student distribution for df degrees of freedom.

In the present example, a value of P=0.99 (99% uncertainty ellipse) is used.

In other examples, the uncertainty can be computed per arc segment (i.e. between consecutive survey points). This can be done by summing the $M_i$ position estimates derived from seismic data belonging to segment i, and $M_i-1$ degrees of freedom in t(P,df).

FIGS. 10A through 12G relate to an example well.

Figure 10C:
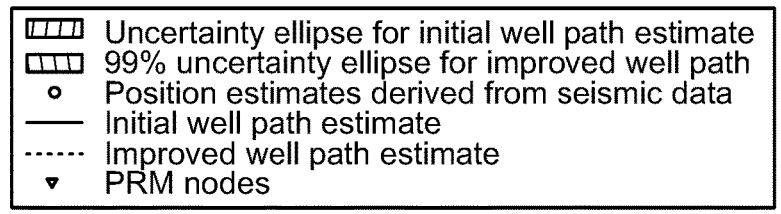
Figure 10C:
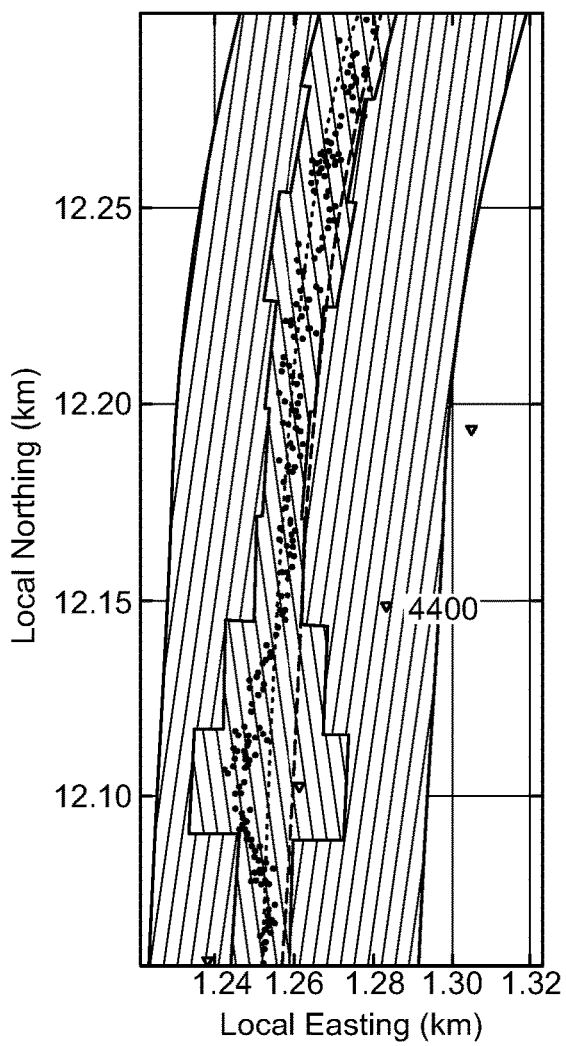
Figure 10D:
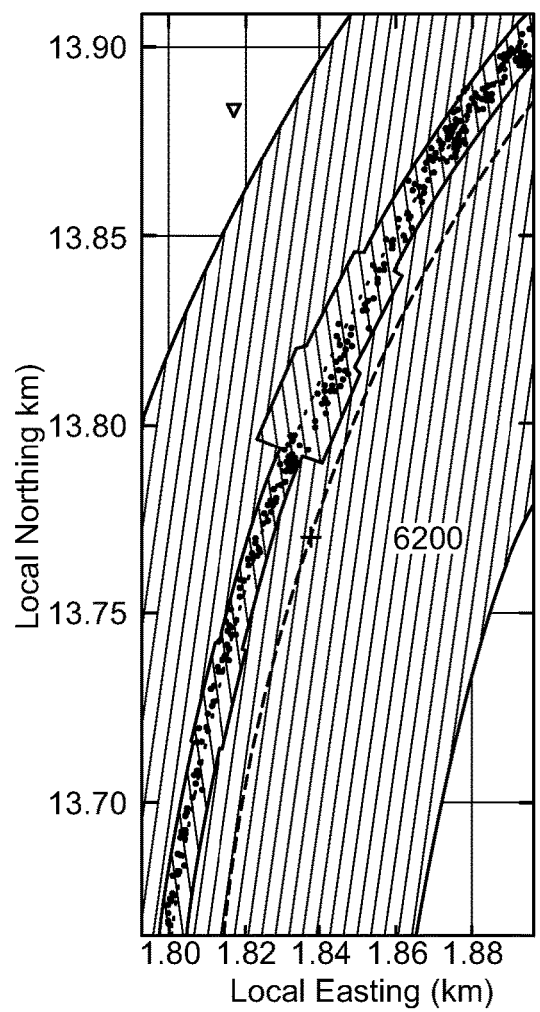
Figure 11A:
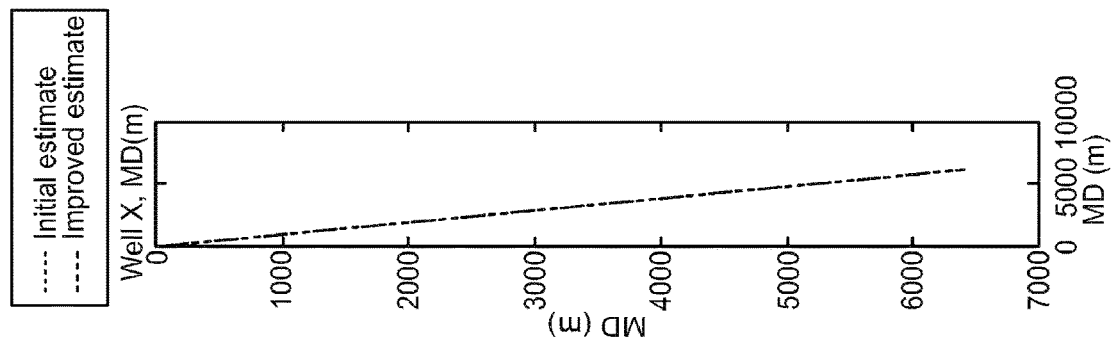
FIGS. 11A through 11G show comparisons of the initial well path estimate and improved well path estimate.
Figure 11B:
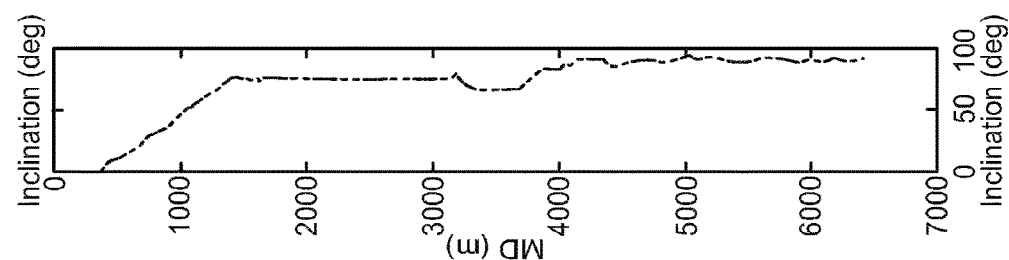
Figure 11C:
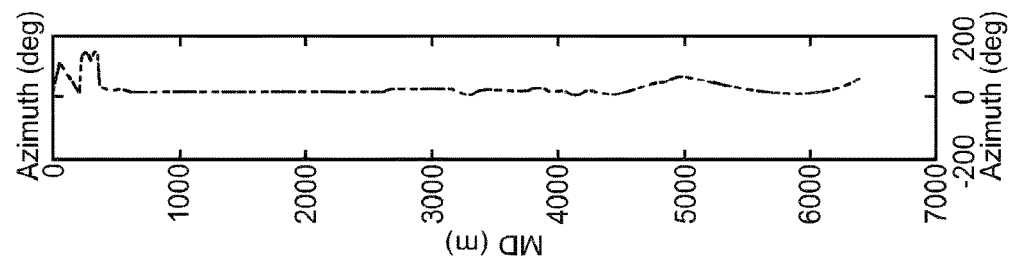
Figure 11D:
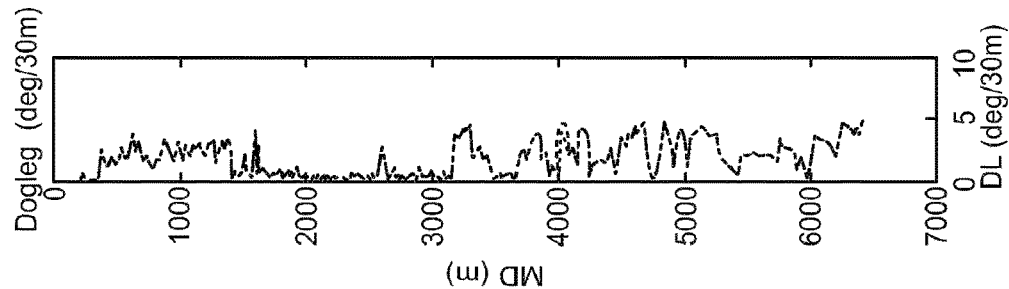
Figure 11E:
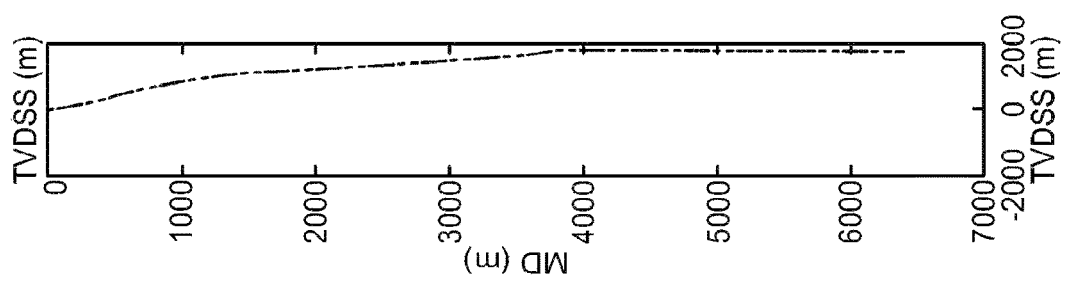
Figure 11F:
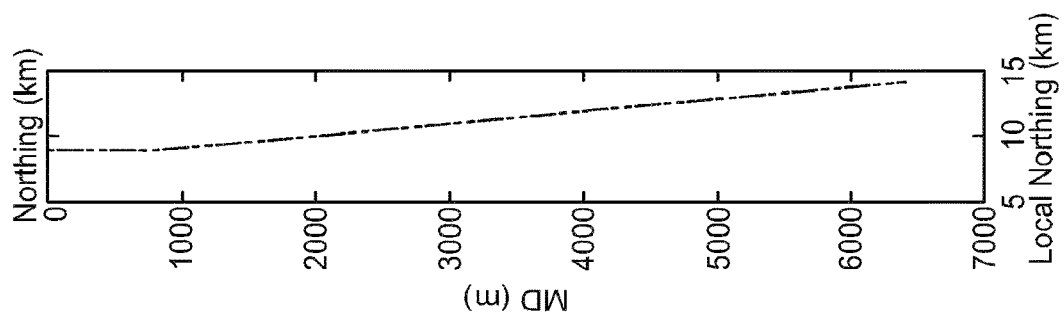
Figure 11G:
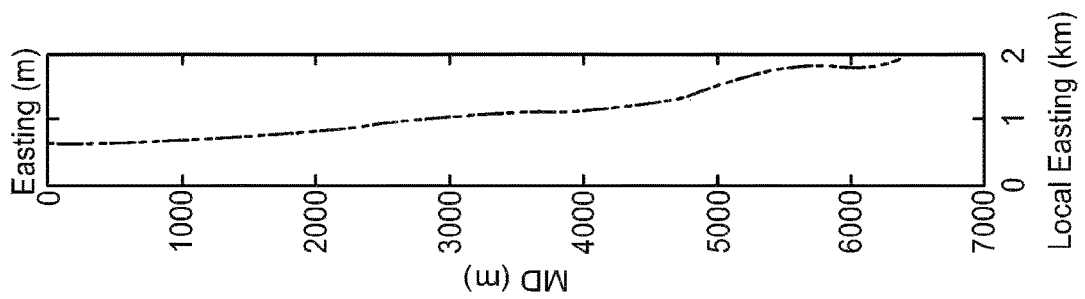

FIGS. 10A through 10D show the initial well path estimate (based solely on the navigation measurements from a downhole tool) and improved well path estimate (using azimuth values obtained by an optimisation process based on the seismic data position estimates) along with their associated uncertainty ellipses, the seismic data positions estimates and the PRM nodes. FIGS. 10A through 10D show varying sections and magnifications of the well path. In FIGS. 10A and 10B, a single uncertainty ellipse is calculated for the whole improved well path estimate. In FIGS. 10C and 10D, an independent uncertainty value is determined for each arc segment (i.e. for each survey point pair). For the purpose of clarity, the uncertainties for each segment are plotted block-wise, rather than with a smooth curve.

FIGS. 10A through 10D show that the lateral uncertainty values are much lower for the improved well path estimate compared to the initial well path estimate.

FIGS. 11A through 11G show comparisons of the initial well path estimate and the improved well path estimate. The following parameters are plotted with respect to MD: MD, inclination, azimuth, DogLeg, TVDSS, Northing and Easting. As can be seen, at this scale the differences are relatively small. The most noticeable differences are in the Easting values, depicted in FIG. 11G.

Figures 12A, 12B, 12C, 12D:
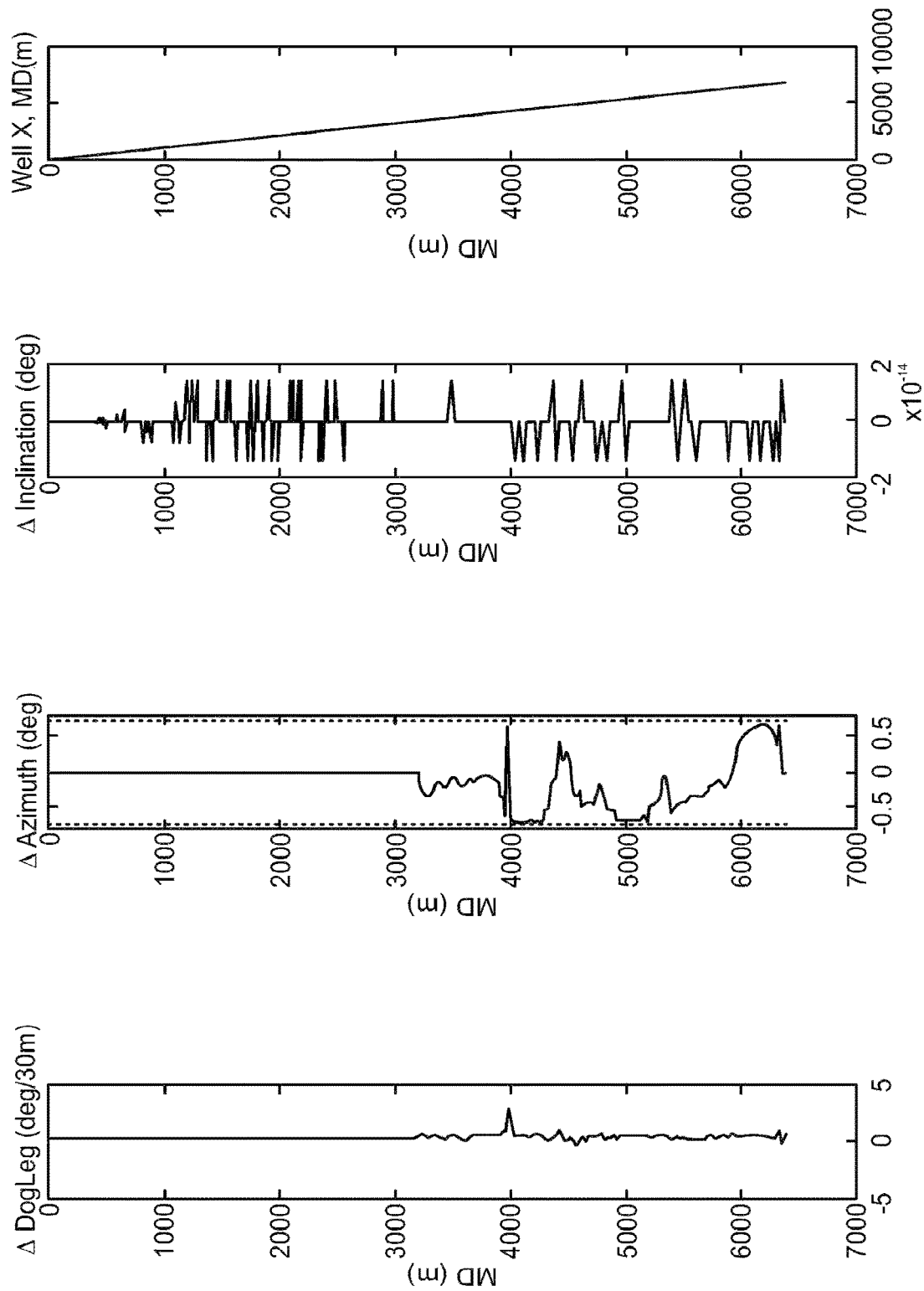
FIGS. 12A through 12G show the differences between the initial well path estimate and the improved well path estimate.
Figure 12E:
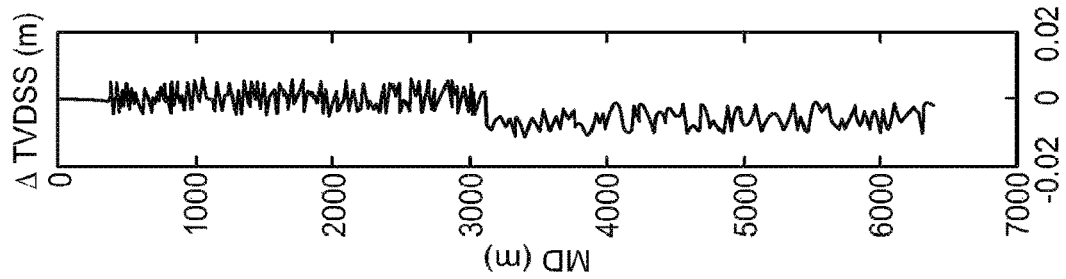
Figure 12F:
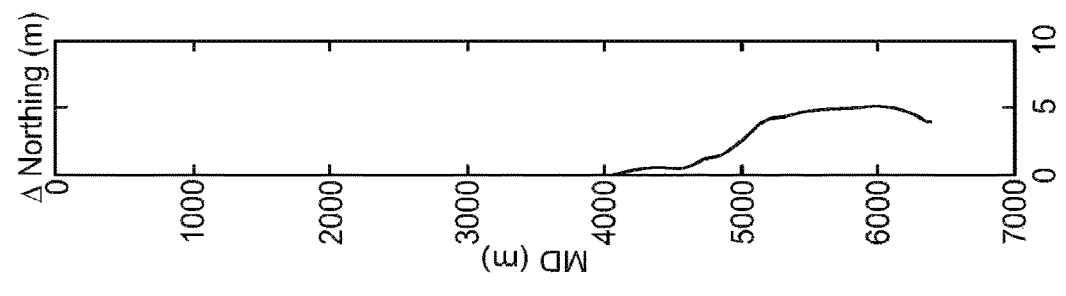
Figure 12G:
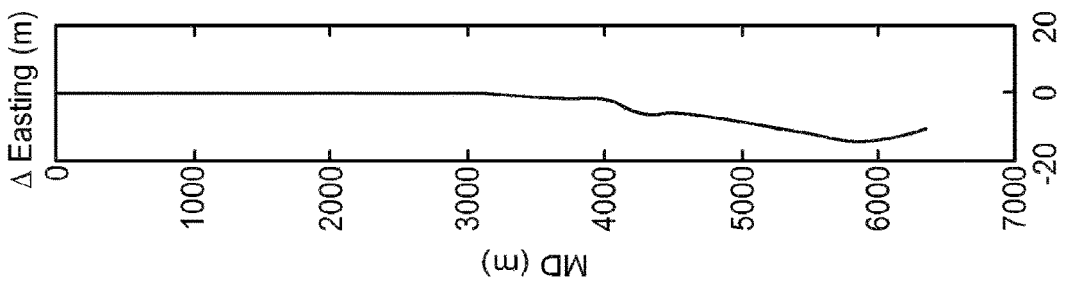

FIGS. 12A through 12G plot the differences in MD, inclination, azimuth, DogLeg, TVDSS, Northing and Easting between the initial well path estimate and the improved well path estimate with respect to MD. The differences in the azimuth (bounded by the upper and lower bound of ±0.74° around the downhole measurements are clearly shown in FIG. 12C. The resulting change in DogLeg can also be seen. The resulting differences in Northing and Easting values along the estimated well paths are shown in FIGS. 12F and 12G.

FIGS. 12B and 12E show differences in the inclination and TVDSS, however, given the scale used in FIGS. 12B and 12E, the differences shown in these Figures are de minimis. They are mainly due to data collection/processing phenomena, rather than intentional differences between the estimated well paths, per se.

The present invention has been described above purely by way of example. Modifications in detail may be made to the present invention within the scope of the claims as appended hereto. Furthermore, features from one example may be combined with an alternative example unless such a combination is explicitly precluded.

The invention claimed is:

1. A method of estimating a position of a well path within a subsurface formation of the Earth, the method comprising determining a well path estimate using navigation measurements from a downhole tool and a position estimate of a point lying on the well path derived from seismic data, the method further comprising determining the well path estimate using the minimum curvature method with a parameter obtained using an optimisation process.

2. The method of claim 1, wherein the navigation measurements from a downhole tool comprise orientation and/or measured depth measurements.

3. The method of claim 1, wherein the navigation measurements from a downhole tool comprise magnetic and/or gyroscopic measurements.

4. The method of claim 1, wherein the position estimate is derived from passive seismic data.

5. The method of claim 1, further comprising
collecting seismic data from a plurality of seismic sensors spread across a region of the surface of the Earth above the downhole tool and/or located in one or more nearby wells; and
deriving the position estimate from the seismic data.

6. The method of claim 1, wherein:
the well path estimate comprises a vertical path component and a lateral path component;
the vertical path component is determined using the navigation measurements from a downhole tool; and
the lateral path component is determined using the position estimate derived from seismic data.

7. The method of claim 6, wherein:
the position estimate derived from seismic data is also used when determining the vertical path component; and/or
the navigation measurements from a downhole tool are also used when determining the lateral path component.

8. The method of claim 1, wherein the optimisation process comprises:
determining a distance between a general definition of a well path modelled using the minimum curvature method and the position estimate derived from seismic data; and
minimising an objective function based on the distance and starting from the navigation measurements to obtain the parameter for the well path estimate.

9. The method of claim 8, wherein the distance is a lateral distance.

10. The method of claim 9, wherein determining the lateral distance between a general definition of a well path modelled using the minimum curvature method and the position estimate derived from seismic data comprises:
identifying an arc of the general definition of a well path modelled using the minimum curvature method that is closest to the position estimate derived from seismic data;
projecting the position estimate derived from seismic data vertically on to the plane spanned by the arc; and
using the geometry of the plane spanned by the arc to derive the minimum lateral distance between the position estimate derived from seismic data and the arc;
using this derived minimum lateral distance as the lateral distance.

11. The method of any of claim 1, wherein the parameter obtained using an optimisation process is an azimuth value.

12. The method of claim 8, wherein the parameter obtained using an optimization process is an inclination value.

13. The method of claim 1, wherein using the minimum curvature method to determine the well path estimate further comprises using a second parameter, the second parameter being from the navigation measurements from a downhole tool.

14. The method of claim 1, further comprising determining a measure of uncertainty of the well path estimate, wherein the lateral measure of uncertainty of the well path estimate is independent of a measured depth.

15. The method of claim 14, wherein determining a measure of the uncertainty comprises calculating a single measure for the entire well path estimate using a statistical distribution of residuals between the well path estimate and position estimates derived from seismic data.

16. The method of claim 14, wherein determining a measure of the uncertainty comprises calculating a plurality of independent measures for different sections of the well path estimate using a statistical distribution of residuals between the well path estimate and position estimates derived from seismic data.

17. The method of claim 1, comprising using the well path estimate to predict the path that the well will take ahead of the downhole tool.

18. The method of claim 1, further comprising deriving the position estimate from seismic data, wherein deriving the position estimate from seismic data comprises:
a) collecting seismic data from a plurality of seismic sensors spread across a region of the surface of the Earth above a drill bit or other noise source and/or located in one or more nearby wells;
b) pre-processing the seismic data to enhance a contribution of drill bit or noise source generated noise;
c) defining a set of points on a grid in 3-dimensional space that includes an expected position of the drill bit or noise source;
d) computing travel times for seismic waves from each said point to each seismic sensor location;
e) for each said point, using the pre-processed seismic data, sensor location data, and computed travel times to compute a semblance stack of travel-time corrected seismic data in a time window;
f) determining the grid location of the maximum semblance and fitting a 3-dimensional function around this grid location; and
g) identifying the location of a maximum of the 3-dimensional function and using that as the estimate derived from seismic data.

19. A method of geosteering, the method comprising:
estimating a position of the well path using the method of claim 1; and
controlling a drill bit in response to the well path estimated to follow a desired well trajectory.

20. A carrier medium comprising computer readable code configured to cause a computer to perform the method of claim 1.

* * * * *